United States Patent
Yamada et al.

(10) Patent No.: US 8,481,205 B2
(45) Date of Patent: Jul. 9, 2013

(54) NONAQUEOUS ELECTROLYTE AND NONAQUEOUS ELECTROLYTE BATTERY

(75) Inventors: Ichiro Yamada, Fukushima (JP); Shunsuke Saito, Fukushima (JP); Haruo Watanabe, Kanagawa (JP); Tadahiko Kubota, Kanagawa (JP)

(73) Assignee: Sony Corporation, Tokyo (JP)

( * ) Notice: Subject to any disclaimer, the term of this patent is extended or adjusted under 35 U.S.C. 154(b) by 214 days.

(21) Appl. No.: 13/157,982

(22) Filed: Jun. 10, 2011

(65) Prior Publication Data

US 2011/0311864 A1 Dec. 22, 2011

(30) Foreign Application Priority Data

Jun. 18, 2010 (JP) ................................ P2010-139691

(51) Int. Cl.
*H01M 6/04* (2006.01)

(52) U.S. Cl.
USPC ............................ 429/188; 429/322; 429/199

(58) Field of Classification Search
USPC ......................................... 429/188, 322, 199
See application file for complete search history.

(56) References Cited

FOREIGN PATENT DOCUMENTS

| JP | 2000-243442 | 9/2000 |
|----|-------------|--------|
| JP | 2002-289188 | 10/2002 |
| JP | 2004-523073 | 7/2004 |
| JP | 2006-505120 | 2/2006 |
| JP | 2007-149535 | 6/2007 |
| JP | 2007-519186 | 7/2007 |
| JP | 2007-273405 | 10/2007 |
| JP | 2008-108586 | 5/2008 |
| JP | 2009-245923 | 10/2009 |
| JP | 2009-259472 | 11/2009 |

*Primary Examiner* — Jane Rhee
(74) *Attorney, Agent, or Firm* — K&L Gates LLP

(57) ABSTRACT

A nonaqueous electrolyte includes: a nonaqueous solvent; an electrolyte salt; a hydrocarbon compound having a nitrile group; and at least one of a heteropolyacid and a heteropolyacid compound.

9 Claims, 8 Drawing Sheets

NONAQUEOUS ELECTROLYTE AND NONAQUEOUS ELECTROLYTE BATTERY

CROSS REFERENCES TO RELATED APPLICATIONS

The present application claims priority to Japanese Priority Patent Application JP 2010-139691 filed in the Japan Patent Office on Jun. 18, 2010, the entire contents of which is hereby incorporated by reference.

BACKGROUND

The present application relates to nonaqueous electrolytes and batteries, specifically to nonaqueous electrolytes that contain an organic solvent and an electrolyte salt, and nonaqueous electrolyte batteries using such nonaqueous electrolytes.

There is a strong demand for smaller, lighter, and longer-life portable electronic devices such as camera-integrated VTRs (Video Tape Recorders), cellular phones, and laptop personal computers, which have become pervasive over the last years. In this connection, batteries, particularly secondary batteries, which are light and capable of providing high energy density, have been developed as the portable power source of such electronic devices.

Particularly, secondary batteries (lithium ion secondary batteries) that take advantage of the storage and release of lithium (Li) for the charge and discharge reaction have been put into a wide range of practical applications for their ability to provide higher energy density than other nonaqueous electrolyte secondary batteries such as lead batteries and nickel cadmium batteries.

The lithium ion secondary batteries include a positive electrode, a negative electrode, and an electrolyte. Increasing the potential of the positive and negative electrodes lowers battery characteristics, because the high-potential positive electrode active material or negative electrode active material reacts with the nonaqueous electrolyte and decomposes the electrolyte, and because the cobalt contained in the positive electrode active material dissolves out.

Concerning the composition of the electrolyte used for secondary batteries, a technique is proposed that uses a compound (nitrile compound) having a nitrile group (or a cyano group: —CN) to improve cycle characteristics and other battery characteristics. As such nitrile compounds, those having a cyanoethyl group (JP-A-2000-243442), and those having a plurality of nitrile groups (JP-T-2007-519186; the term "JP-T" as used herein means a published Japanese translation of a PCT patent application) are used. With this technique, the nitrile compound can stabilize the transition metals and transition metal oxides, and can thus suppress the dissolving of the transition metals from the positive electrode active material.

SUMMARY

However, even with the nitrile compound contained in the electrodes or electrolyte, the reactivity between the negative electrode and the electrolyte increases in continuous charging, and the decomposition of the electrolyte causes gas production and makes the battery characteristics insufficient.

Accordingly, there is a need for a nonaqueous electrolyte and a nonaqueous electrolyte battery having improved high-temperature cycle characteristics and improved battery characteristics during the continuous charge.

According to an embodiment, there is provided a nonaqueous electrolyte that includes a nonaqueous solvent, an electrolyte salt, a hydrocarbon compound having a nitrile group, and at least one of a heteropolyacid and a heteropolyacid compound.

According to another embodiment, there is provided a nonaqueous electrolyte battery that includes a positive electrode, a negative electrode, and a nonaqueous electrolyte, wherein the negative electrode includes a gel coating formed in at least a portion on a surface of the negative electrode, the gel coating originating from at least one of a heteropolyacid and a heteropolyacid compound, and including an amorphous polyacid and/or polyacid salt compound that contain one or more polyelements, and wherein a component that originates from a hydrocarbon compound having a nitrile group is adsorbed in at least a portion on a surface of the coating.

It is preferable that the heteropolyacid and the heteropolyacid compound in the embodiments be represented by the following formulae (I) to (IV).

$$H_xA_y[BD_6O_{24}]\cdot zH_2O \quad (I)$$

wherein A represents lithium (Li), sodium (Na), potassium (K), rubidium (Rb), cesium (Cs), magnesium (Mg), calcium (Ca), aluminum (Al), ammonium (NH$_4$), an ammonium salt, or a phosphonium salt, B represents phosphorus (P), silicon (Si), arsenic (As), or germanium (Ge), D is one or more elements selected from titanium (Ti), vanadium (V), chromium (Cr), manganese (Mn), iron (Fe), cobalt (Co), nickel (Ni), copper (Cu), zinc (Zn), gallium (Ga), zirconium (Zr), niobium (Nb), molybdenum (Mo), technetium (Tc), rhodium (Rh), cadmium (Cd), indium (In), tin (Sn), tantalum (Ta), tungsten (W), rhenium (Re), and thallium (Tl), x, y, and z satisfy $0 \leq x \leq 8$, $0 \leq y \leq 8$, and $0 \leq z \leq 50$, respectively, where at least one of x and y is not 0;

$$H_xA_y[BD_{12}O_{40}]\cdot zH_2O \quad (II)$$

wherein A represents lithium (Li), sodium (Na), potassium (K), rubidium (Rb), cesium (Cs), magnesium (Mg), calcium (Ca), aluminum (Al), ammonium (NH$_4$), an ammonium salt, or a phosphonium salt, B represents phosphorus (P), silicon (Si), arsenic (As), or germanium (Ge), D is one or more elements selected from titanium (Ti), vanadium (V), chromium (Cr), manganese (Mn), iron (Fe), cobalt (Co), nickel (Ni), copper (Cu), zinc (Zn), gallium (Ga), zirconium (Zr), niobium (Nb), molybdenum (Mo), technetium (Tc), rhodium (Rh), cadmium (Cd), indium (In), tin (Sn), tantalum (Ta), tungsten (W), rhenium (Re), and thallium (Tl), x, y, and z satisfy $0 \leq x \leq 4$, $0 \leq y \leq 4$, and $0 \leq z \leq 50$, respectively, where at least one of x and y is not 0;

$$H_xA_y[B_2D_{18}O_{62}]\cdot zH_2O \quad (III)$$

wherein A represents lithium (Li), sodium (Na), potassium (K), rubidium (Rb), cesium (Cs), magnesium (Mg), calcium (Ca), aluminum (Al), ammonium (NH$_4$), an ammonium salt, or a phosphonium salt, B represents phosphorus (P), silicon (Si), arsenic (As), or germanium (Ge), D is one or more elements selected from titanium (Ti), vanadium (V), chromium (Cr), manganese (Mn), iron (Fe), cobalt (Co), nickel (Ni), copper (Cu), zinc (Zn), gallium (Ga), zirconium (Zr), niobium (Nb), molybdenum (Mo), technetium (Tc), rhodium (Rh), cadmium (Cd), indium (In), tin (Sn), tantalum (Ta), tungsten (W), rhenium (Re), and thallium (Tl), x, y, and z satisfy $0 \leq x \leq 8$, $0 \leq y \leq 8$, and $0 \leq z \leq 50$, respectively, where at least one of x and y is not 0;

$$H_xA_y[B_5D_{30}O_{110}]\cdot zH_2O \quad (IV)$$

wherein A represents lithium (Li), sodium (Na), potassium (K), rubidium (Rb), cesium (Cs), magnesium (Mg), calcium (Ca), aluminum (Al), ammonium ($NH_4$), an ammonium salt, or a phosphonium salt, B represents phosphorus (P), silicon (Si), arsenic (As), or germanium (Ge), D is one or more elements selected from titanium (Ti), vanadium (V), chromium (Cr), manganese (Mn), iron (Fe), cobalt (Co), nickel (Ni), copper (Cu), zinc (Zn), gallium (Ga), zirconium (Zr), niobium (Nb), molybdenum (Mo), technetium (Tc), rhodium (Rh), cadmium (Cd), indium (In), tin (Sn), tantalum (Ta), tungsten (W), rhenium (Re), and thallium (Tl), x, y, and z satisfy $0 \leq x \leq 15$, $0 \leq y \leq 15$, and $0 \leq z \leq 50$, respectively, where at least one of x and y is not 0.

In the embodiments, the nonaqueous electrolyte includes a nonaqueous solvent, an electrolyte salt, a hydrocarbon compound having a nitrile group, and at least one of a heteropolyacid and a heteropolyacid compound. In this way, the hydrocarbon compound having a nitrile group is coordinatively adsorbed on the electrode active material surface at the positive electrode, and the reaction between the positive electrode and the nonaqueous electrolyte is suppressed. At the negative electrode, a coating that originates from at least one of the heteropolyacid and heteropolyacid compound is formed, and the hydrocarbon compound having a nitrile group is coordinatively adsorbed on the coating. The reaction between the negative electrode and the nonaqueous electrolyte is thus suppressed. Note that the heteropolyacid and/or heteropolyacid compound will also be appropriately referred to as "heteropolyacid compound".

In the embodiments, the nonaqueous electrolyte includes a hydrocarbon compound having a nitrile group, and at least one of a heteropolyacid and a heteropolyacid compound. In this way, the side reactions of the electrode active materials and the electrolyte during the charge and discharge can be suppressed, and gas production during the high-temperature cycle and continuous charge can be suppressed.

Additional features and advantages are described herein, and will be apparent from the following Detailed Description and the figures.

DETAILED DESCRIPTION

Figure 1:
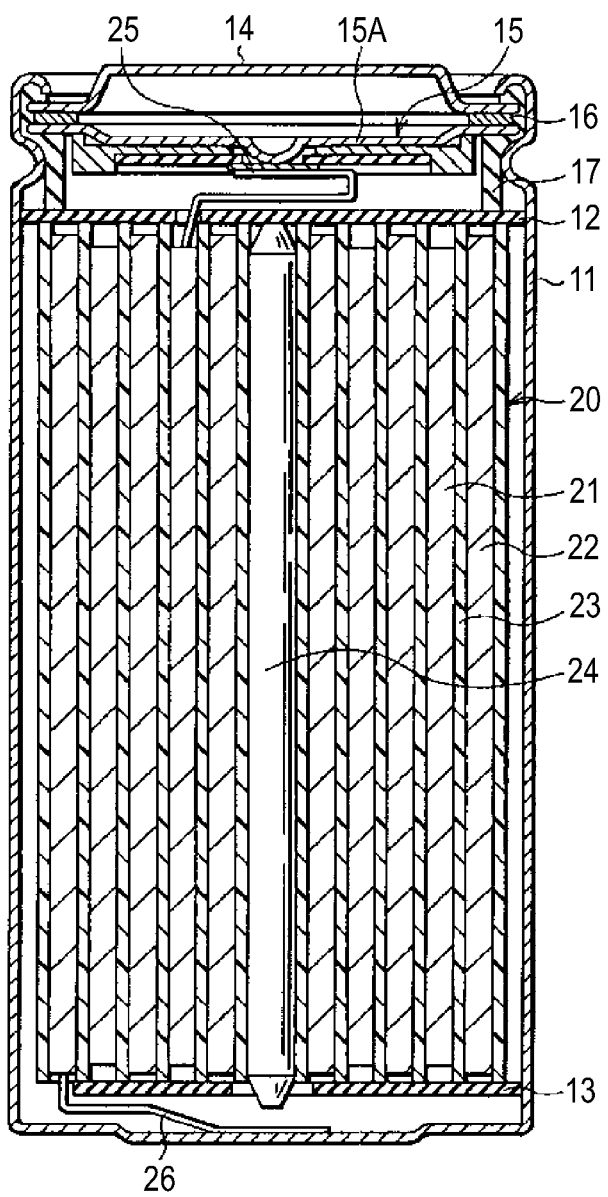
FIG. 1 is a cross sectional view illustrating an exemplary configuration of a nonaqueous electrolyte battery according to an embodiment.

Embodiments of the present application will be described below in detail with reference to the drawings.

1. First Embodiment (example of a nonaqueous electrolyte that includes a nitrile group-containing hydrocarbon compound and a heteropolyacid compound of the present disclosure)

2. Second Embodiment (example using a cylindrical nonaqueous electrolyte battery)

3. Third Embodiment (example using a laminate film-type nonaqueous electrolyte battery)

4. Fourth Embodiment (example using a laminate film-type nonaqueous electrolyte battery)

5. Fifth Embodiment (example using a rectangular nonaqueous electrolyte battery)

6. Sixth Embodiment (example of a nonaqueous electrolyte battery using a laminated electrode unit)

7. Other Embodiments

1. First Embodiment

A nonaqueous electrolyte according to First Embodiment is described below. A nonaqueous electrolyte according to First Embodiment is used for electrochemical devices, for example, such as batteries. The nonaqueous electrolyte includes a nonaqueous solvent, an electrolyte salt, a nitrile group-containing hydrocarbon compound, and at least one of a heteropolyacid and a heteropolyacid compound. The electrolyte salt, the nitrile group-containing hydrocarbon compound, and the heteropolyacid compound are dissolved in the solvent.

(1-1) Nitrile Group-Containing Hydrocarbon Compound

The nonaqueous electrolyte according to the embodiment includes a hydrocarbon compound having a nitrile group (hereinafter, also referred to as "nitrile compound"). Two or more nitrile group-containing hydrocarbon compounds may be selected and used in combination.

With the nitrile group-containing hydrocarbon compound contained in the nonaqueous electrolyte, the nitrile group is coordinatively adsorbed on the active spot metal surface of the positive electrode active material, and the reactivity between the positive electrode and the electrolyte is lowered. The coordinative adsorption of the nitrile group-containing hydrocarbon compound occurs not only on the positive electrode but also on the coating (described later) that includes the heteropolyacid compound and is formed on the negative electrode surface, and the reactivity between the negative electrode and the electrolyte is lowered. Thus, the nitrile group-containing hydrocarbon compound is believed to suppress the decomposition reaction of the electrolyte at the positive and negative electrodes.

The following specifically lists non-limiting examples of the nitrile compound.

Mononitrile compounds such as acetonitrile, propionitrile, butyronitrile, valeronitrile, and hexanenitrile; dinitrile compounds such as malononitrile, succinonitrile, glutaronitrile, adiponitrile, pimelonitrile, suberonitrile, azelanitrile, sebaconitrile, undecanedinitrile, and dodecanedinitrile; trinitrile compounds such as 1,2,3-propane tricarbonitrile, and 1,3,5-pentane tricarbonitrile. Of these, mononitrile and dinitrile compounds such as acetonitrile, propionitrile, butyronitrile, succinonitrile, glutaronitrile, and adiponitrile are preferred for easy availability and for their ability to provide strong effects. These additives may be used as a mixture of two or more.

The boiling point of the nitrile compound itself increases as the number of carbon atoms in the nitrile group-containing hydrocarbon compound increases. This is advantageous in terms of suppressing gas production. On the other hand, increased carbon atoms cause a relative decrease in the concentration on the nitrile group. Thus, the nitrile group-containing hydrocarbon compound preferably contains 2 to 4 carbon atoms, excluding the carbon atoms of the nitrile group.

The content of the nitrile compound in the nonaqueous electrolyte is preferably from 0.05 to 5.0 weight %, more preferably 0.1 to 3.0 weight %. With an excessively small nitrile compound content, sufficient effects cannot be obtained for the active spots on the positive and negative electrodes, and side reactions cannot be suppressed. An excessively large nitrile compound content is not preferable, because it makes the resistance of the electrolyte too high, and causes deterioration of other battery characteristics.

(1-2) Heteropolyacid Compound

The nonaqueous electrolyte according to the embodiment includes at least one of a heteropolyacid and a heteropolyacid compound.

With at least one of a heteropolyacid and a heteropolyacid compound contained in the nonaqueous electrolyte, a stable coating called SEI (Solid Electrolyte Interface) is formed on the electrode surfaces, particularly on the negative electrode surface, by the charge and discharge in initial use. The coating originating from the heteropolyacid compound and capable of Li insertion and desorption has excellent Li ion permeability, and is thus believed to lower gas production during high-temperature use while suppressing the reaction between the electrodes and the nonaqueous electrolyte, without impairing cycle characteristics.

The heteropolyacid compound of the embodiment is formed from heteropolyacids, condensation products of two or more oxoacids. The polyacid ions of the heteropolyacid compound preferably have a structure, such as the Anderson structure, Keggin structure, Dawson structure, and Preyssler structure, that easily dissolves in the battery solvent.

The heteropolyacids forming the heteropolyacid and heteropolyacid compound are those including either a polyatom selected from element group (a), or a polyatom selected from element group (a), and in which some of the polyatoms are replaced with at least one selected from element group (b).

Element group (a): Mo, W, Nb, V
Element group (b): Ti, Cr, Mn, Fe, Co, Ni, Cu, Zn, Ga, Zr, Tc, Rh, Cd, In, Sn, Ta, Re, Tl, Pb Further, the heteropolyacid compound and heteropolyacid are those including either a heteroatom selected from element group (c), or a heteroatom selected from element group (c), and in which some of the heteroatoms are replaced with at least one selected from element group (d).

Element group (c): B, Al, Si, P, Cr, Mn, Fe, Co, Ni, Cu, Zn, Ge, As
Element group (d): H, Be, B, C, Na, Al, Si, P, S, Ti, V, Cr, Mn, Fe, Co, Ni, Cu, Zn, Ga, Ge, As, Se, Zr, Rh, Sn, Sb, Te, I, Re, Pt, Bi, Ce, Th, U, Np Examples of the heteropolyacid included in the heteropolyacid compound used in the embodiment include heteropolytungstic acids such as phosphotungstic acid and silicotungstic acid, and heteropolymolybdic acids such as phosphomolybdic acid and silicomolybdic acid. Examples of materials that include more than one polyelement include phosphovanadomolybdic acid, phosphotungstomolybdic acid, silicovanadomolybdic acid, and silicotungstomolybdic acid.

The heteropolyacid compound used in the embodiment is at least one selected from the compounds of the following formulae (I) to (IV).

$$H_xA_y[BD_6O_{24}]\cdot zH_2O$$   Formula (I): Anderson structure

In the formula, A represents lithium (Li), sodium (Na), potassium (K), rubidium (Rb), cesium (Cs), magnesium (Mg), calcium (Ca), aluminum (Al), ammonium ($NH_4$), ammonium salt, or a phosphonium salt. B represents phosphorus (P), silicon (Si), arsenic (As), or germanium (Ge). D is one or more elements selected from titanium (Ti), vanadium (V), chromium (Cr), manganese (Mn), iron (Fe), cobalt (Co), nickel (Ni), copper (Cu), zinc (Zn), gallium (Ga), zirconium (Zr), niobium (Nb), molybdenum (Mo), technetium (Tc), rhodium (Rh), cadmium (Cd), indium (In), tin (Sn), tantalum (Ta), tungsten (W), rhenium (Re), and thallium (Tl). The variables x, y, and z satisfy $0 \leq x \leq 8$, $0 \leq y \leq 8$, and $0 \leq z \leq 50$, respectively, where at least one of x and y is not 0.

$$H_xA_y[BD_{12}O_{40}]\cdot zH_2O$$  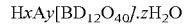 Formula (II): Keggin structure

In the formula, A represents lithium (Li), sodium (Na), potassium (K), rubidium (Rb), cesium (Cs), magnesium (Mg), calcium (Ca), aluminum (Al), ammonium ($NH_4$), ammonium salt, or a phosphonium salt. B represents phosphorus (P), silicon (Si), arsenic (As), or germanium (Ge). D is one or more elements selected from titanium (Ti), vanadium (V), chromium (Cr), manganese (Mn), iron (Fe), cobalt (Co), nickel (Ni), copper (Cu), zinc (Zn), gallium (Ga), zirconium (Zr), niobium (Nb), molybdenum (Mo), technetium (Tc), rhodium (Rh), cadmium (Cd), indium (In), tin (Sn), tantalum (Ta), tungsten (W), rhenium (Re), and thallium (Tl). The variables x, y, and z satisfy $0 \leq x \leq 4$, $0 \leq y \leq 4$, and $0 \leq z \leq 50$, respectively, where at least one of x and y is not 0.

$$H_xA_y[B_2D_{18}O_{62}]\cdot zH_2O$$  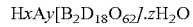 Formula (III): Dawson structure In the formula, A represents lithium (Li), sodium (Na), potassium (K), rubidium (Rb), cesium (Cs), magnesium (Mg), calcium (Ca), aluminum (Al), ammonium ($NH_4$), an ammonium salt, or a phosphonium salt. B represents phosphorus (P), silicon (Si), arsenic (As), or germanium (Ge). D is one or more elements selected from titanium (Ti), vanadium (V), chromium (Cr), manganese (Mn), iron (Fe), cobalt (Co), nickel (Ni), copper (Cu), zinc (Zn), gallium (Ga), zirconium (Zr), niobium (Nb), molybdenum (Mo), technetium (Tc), rhodium (Rh), cadmium (Cd), indium (In), tin (Sn), tantalum (Ta), tungsten (W), rhenium (Re), and thallium (Tl). The variables x, y, and z satisfy $0 \leq x \leq 8$, $0 \leq y \leq 8$, and $0 \leq z \leq 50$, respectively, where at least one of x and y is not 0.

$$H_xA_y[B_5D_{30}O_{110}]\cdot zH_2O$$  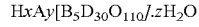 Formula (IV): Preyssler structure In the formula, A represents lithium (Li), sodium (Na), potassium (K), rubidium (Rb), cesium (Cs), magnesium (Mg), calcium (Ca), aluminum (Al), ammonium ($NH_4$), an ammonium salt, or a phosphonium salt. B represents phosphorus (P), silicon (Si), arsenic (As), or germanium (Ge). D is one or more elements selected from titanium (Ti), vanadium (V), chromium (Cr), manganese (Mn), iron (Fe), cobalt (Co), nickel (Ni), copper (Cu), zinc (Zn), gallium (Ga), zirconium (Zr), niobium (Nb), molybdenum (Mo), technetium (Tc), rhodium (Rh), cadmium (Cd), indium (In), tin (Sn), tantalum (Ta), tungsten (W), rhenium (Re), and thallium (Tl). The variables x, y, and z satisfy $0 \leq x \leq 15$, $0 \leq y \leq 15$, and $0 \leq z \leq 50$, respectively, where at least one of x and y is not 0.

The heteropolyacid compound preferably has a cation, for example, such as $Li^+$, $Na^+$, $K^+$, $Rb^+$, $Cs^+$, $R_4N^+$, and $R_4P^+$ (where R is H or a hydrocarbon group of 10 or less carbon atoms). The cation is preferably $Li^+$, tetra-n-butylammonium, or tetra-n-butylphosphonium.

Examples of such heteropolyacid compounds include heteropolytungstic acid compounds such as sodium silicotungstate, sodium phosphotungstate, ammonium phosphotungstate, and tetra-tetra-n-butyl phosphonium silicotungstate. Other examples of heteropolyacid compounds include heteropolymolybdic acid compounds such as sodium phosphomolybdate, ammonium phosphomolybdate, and tri-tetra-n-butyl ammonium phosphomolybdate. Examples of compounds that include more than one polyelement include materials such as tri-tetra-n-ammonium phosphotungstomolybdate. The heteropolyacid and heteropolyacid compound may be used as a mixture of two or more. The heteropolyacid and heteropolyacid compound easily dissolve in the solvent, and, because of the stability in the battery, do not easily cause adverse effects, for example, by reacting with other materials.

In the embodiment, at least one of the polyacid and polyacid compound may be used. The polyacid ions of the polyacid and polyacid compound are preferably of a structure, such as the Anderson structure, Keggin structure, Dawson structure, and Preyssler structure, that easily dissolves in the battery solvent. Aside from the heteropolyacid compound, an isopolyacid compound may be used as the polyacid compound. The isopolyacid compound is not as effective as the heteropolyacid compound per added weight. However, because of low solubility in polar solvent, the isopolyacid compound, when used for the positive and negative electrodes, provides excellent coating characteristics, including coating viscoelasticity and anti-deterioration property over time, and is therefore useful from the industrial standpoint.

As with the case of the heteropolyacid compound, the polyacid compounds used in the embodiment are those including either a polyatom selected from element group (a), or a polyatom selected from element group (a), and in which some of the polyatoms are replaced with at least one selected from element group (b).

Element group (a): Mo, W, Nb, V
Element group (b): Ti, Cr, Mn, Fe, Co, Ni, Cu, Zn, Ga, Zr, Tc, Rh, Cd, In, Sn, Ta, Re, Tl, Pb Examples of the polyacid included in the polyacid compounds used in the embodiment include tungstic acid (VI), and molybdic acid (VI). Specific examples include tungstic anhydride, molybdenum anhydride, and hydrates of these. Examples of hydrates include ortho-tungstic acids ($H_2WO_4$), specifically tungstic acid monohydrate ($WO_3 \cdot H_2O$); and ortho-molybdic acids ($H_2MoO_4$), specifically molybdic acid dihydrates ($H_4MoO_5$, $H_2MoO_4 \cdot H_2O$, $MoO_3 \cdot 2H_2O$), and molybdic acid monohydrate ($MoO_3 \cdot H_2O$). It is also possible to use tungstic anhydride ($WO_3$) having less, ultimately zero, hydrogen content than isopolyacids of the foregoing hydrates, such as meta-tungstic acid and para-tungstic acid, or molybdenum anhydride ($MoO_3$) having less, ultimately zero, hydrogen content than meta-molybdic acid, para-molybdic acid, and the like.

The nonaqueous electrolyte includes the heteropolyacid compounds of formulae (I) to (IV). Two or more selected from the heteropolyacids or heteropolyacid compounds of formulae (I) to (IV) also can be used in combination.

The contents of the heteropolyacid and heteropolyacid compound in the nonaqueous electrolyte are preferably from 0.01 weight % to 3.0 weight %, inclusive, more preferably from 0.05 weight % to 3.0 weight %, inclusive. When the heteropolyacid and heteropolyacid compound contents are excessively small, SEI formation becomes insufficient, and it becomes difficult to obtain the effect of adding the heteropolyacid compound. The excess contents are not preferable, because the reaction makes the irreversible capacity too large, and lowers the battery capacity.

The nitrile group compound is coordinatively adsorbed also on the SEI coating originating from the heteropolyacid compound, and the reactivity between the negative electrode and the electrolyte is lowered.

In a battery using a nonaqueous electrolyte that does not include the nitrile compound, continuous charging causes the metal ions to dissolve out of the heteropolyacid compound, and makes the SEI coating on the negative electrode surface unstable. On the other hand, with the electrolyte that includes the nitrile compound with the heteropolyacid compound, the nitrile compound is coordinatively adsorbed on the SEI coating that originates from the heteropolyacid compound. That is, the nitrile compound protects the SEI coating on the negative electrode.

It is thus believed that the nitrile compound suppresses the decomposition reaction of the electrolyte at the positive and negative electrodes.

(1-3) Configuration of Nonaqueous Electrolyte Used for Addition of Nitrile Group-Containing Hydrocarbon Compound and Heteropolyacid Compound Electrolyte Salt The electrolyte salt includes, for example, one or more light metal salts such as lithium salts. Examples of lithium salts include lithium hexafluorophosphate ($LiPF_6$), lithium tetrafluoroborate ($LiBF_4$), lithium perchloride ($LiClO_4$), lithium hexafluoroarsenate ($LiAsF_6$), lithium tetraphenylborate ($LiB(C_6H_5)_4$), lithium methanesulfonate ($LiCH_3SO_3$), lithium trifluoromethanesulfonate ($LiCF_3SO_3$), lithium tetrachloroaluminate ($LiAlCl_4$), dilithium hexafluorosilicate ($Li_2SiF_6$), lithium chloride (LiCl), and lithium bromide (LiBr). A least one selected from lithium hexafluorophosphate ($LiPF_6$), lithium tetrafluoroborate ($LiBF_4$), lithium perchloride ($LiClO_4$), and lithium hexafluoroarsenate ($LiAsF_6$) is preferable, of which lithium hexafluorophosphate ($LiPF_6$) is more preferable. These are preferable for their ability to lower the resistance of the nonaqueous electrolyte. Use of lithium hexafluorophosphate ($LiPF_6$) with lithium tetrafluoroborate ($LiBF_4$) is particularly preferred, because it provides strong effects.

Nonaqueous Solvent

Examples of nonaqueous solvent include ethylene carbonate (EC), propylene carbonate (PC), butylene carbonate (BC), dimethyl carbonate (DMC), diethyl carbonate (DEC), ethylmethyl carbonate (EMC), methylpropyl carbonate (MPC), butyrolactone, γ-valerolactone, 1,2-dimethoxyethane, tetrahydrofuran, 2-methyltetrahydrofuran, tetrahydropyran, 1,3-dioxolan, 4-methyl-1,3-dioxolan, 1,3-dioxane, 1,4-dioxane, methyl acetate, ethyl acetate, methylpropionate, ethyl propionate, methyl butyrate, isomethyl butyrate, trimethylmethyl acetate, trimethylethyl acetate, acetonitrile, glutaronitrile, adiponitrile, methoxyacetonitrile, 3-methoxypropionitrile, N,N-dimethylformamide, N-methylpyrrolidinone, N-methyloxazolidinone, N,N'-dimethylimidazolidinone, nitromethane, nitroethane, sulfolane, trimethyl phosphate, and dimethyl sulfoxide. There provide excellent capacity, excellent cycle characteristics, and excellent storage characteristics in batteries and other electrochemical devices that use nonaqueous electrolytes. These may be used either alone, or as a mixture of two or more.

Preferably, the solvent used includes at least one selected from ethylene carbonate (EC), propylene carbonate (PC), dimethyl carbonate (DMC), diethyl carbonate (DEC), and ethylmethyl carbonate (EMC). These are preferable for their ability to provide sufficient effects. In this case, it is preferable to use a high-viscosity (high-dielectric) solvent (for example, relative permittivity ∈≧30), for example, such as ethylene carbonate and propylene carbonate, as a mixture with a low-viscosity solvent (for example, viscosity≦1 mPa·s), for example, such as dimethyl carbonate, diethyl carbonate, and ethylmethyl carbonate. The use of such mixtures improves the dissociation of the electrolyte salt and ion mobility, and thus provides stronger effects.

The nonaqueous solvent may contain cyclic carbonate represented by the following formula (V) or (VI). Two or more selected from the compounds of formulae (V) and (VI) may be used in combination.

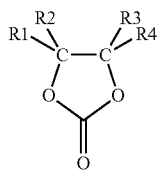

(V)

In the formula, R1 to R4 are hydrogen groups, halogen groups, alkyl groups, or halogenated alkyl group, and at least one of R1 to R4 is a halogen group or a halogenated alkyl group.

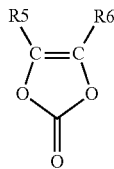

(VI)

In the formula, R5 and R6 are hydrogen groups or alkyl groups.

Examples of halogen-containing cyclic carbonate esters represented by formula (V) include 4-fluoro-1,3-dioxolan-2-one, 4-chloro-1,3-dioxolan-2-one, 4,5-difluoro-1,3-dioxolan-2-one, tetrafluoro-1,3-dioxolan-2-one, 4-chloro-5-fluoro-1,3-dioxolan-2-one, 4,5-dichloro-1,3-oxolan-2-one, tetrachloro-1,3-dioxolan-2-one, 4,5-bistrifluoromethyl-1,3-dioxolan-2-one, 4-trifluoromethyl-1,3-dioxolan-2-one, 4,5-difluoro-4,5-dimethyl-1,3-dioxolan-2-one, 4,4-difluoro-5-methyl-1,3-dioxolan-2-one, 4-ethyl-5,5-difluoro-1,3-dioxolan-2-one, 4-fluoro-5-trifluoromethyl-1,3-dioxolan-2-one, 4-methyl-5-trifluoromethyl-1,3-dioxolan-2-one, 4-fluoro-4,5-dimethyl-1,3-dioxolan-2-one, 5-(1,1-difluoroethyl)-4,4-difluoro-1,3-dioxolan-2-one, 4,5-dichloro-4,5-dimethyl-1,3-dioxolan-2-one, 4-ethyl-5-fluoro-1,3-dioxolan-2-one, 4-ethyl-4,5-difluoro-1,3-dioxolan-2-one, 4-ethyl-4,5,5-trifluoro-1,3-dioxolan-2-one, and 4-fluoro-4-methyl-1,3-dioxolan-2-one. These may be used either alone, or as a mixture of two or more. Of these, 4-fluoro-1,3-dioxolan-2-one and 4,5-difluoro-1,3-dioxolan-2-one are preferable, because these are readily available, and can provide strong effects.

Examples of unsaturated bond-containing cyclic carbonate esters represented by formula (VI) include vinylene carbonate (1,3-dioxole-2-one), methylvinylene carbonate (4-methyl-1,3-dioxole-2-one), ethylvinylene carbonate (4-ethyl-1,3-dioxole-2-one), 4,5-dimethyl-1,3-dioxole-2-one, 4,5-diethyl-1,3-dioxole-2-one, 4-fluoro-1,3-dioxole-2-one, and 4-trifluoromethyl-1,3-dioxole-2-one. These may be used either alone, or as a mixture of two or more. Of these, vinylene carbonate is preferred, because it is readily available, and can provide strong effects.

Polymer Compound

In the embodiment, the nonaqueous electrolyte as a mixture of the nonaqueous solvent and the electrolyte salt may exist in a gel state with a polymer compound-containing retainer.

Materials that gel by absorbing the solvent can be used as the polymer compound. Examples include fluoro polymer compounds such as a copolymer of polyvinylidene fluoride or vinylidene fluoride with hexafluoropropylene; ether polymer compounds such as a crosslinked product including polyethylene oxide or polyethylene oxide; and compounds including repeating units of polyacrylonitrile, polypropylene oxide, or polymethylmethacrylate. The polymer compounds may be used either alone, or as a mixture of two or more.

From the standpoint of redox stability, fluoro polymer compounds are particularly preferable, of which copolymers containing vinylidene fluoride and hexafluoropropylene components are preferred. For improved characteristics, the copolymer may also include monoesters of unsaturated diacids such as monomethyl maleate; halogenated ethylene such as chlorotrifluoroethylene; cyclic carbonate esters of unsaturated compounds such as vinylene carbonate; or an epoxy group-containing acrylvinyl monomer.

The method of forming a gel electrolyte layer will be described later.

Advantages

In First Embodiment, the nitrile group-containing hydrocarbon compound, and at least one of the heteropolyacids and heteropolyacid compounds represented by formulae (I) to (IV) are contained in the nonaqueous electrolyte. In this way, the cycle-involving dissolving of the negative electrode SEI coating can be suppressed, and the reaction between the electrode and the nonaqueous electrolyte can be suppressed over extended time periods.

2. Second Embodiment

A nonaqueous electrolyte battery according to Second Embodiment is described below. The nonaqueous electrolyte battery of Second Embodiment is a cylindrical nonaqueous electrolyte battery.

(2-1) Configuration of Nonaqueous Electrolyte Battery

Figure 2:
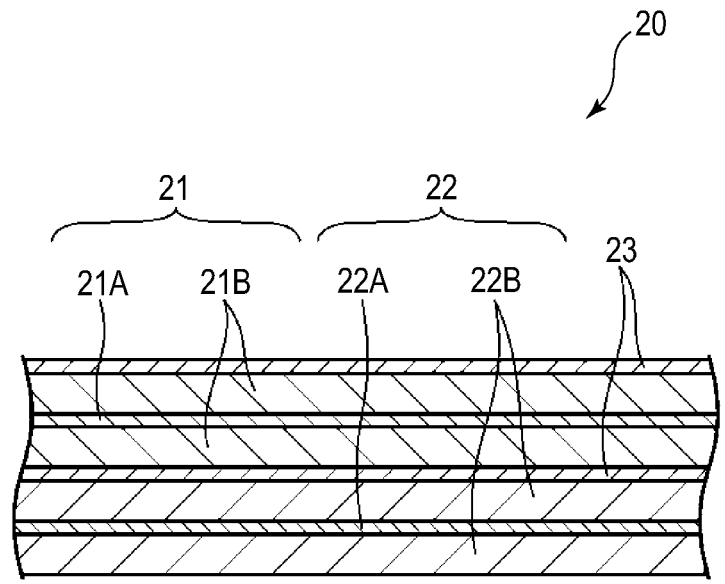
FIG. 2 is a partially enlarged cross sectional view of a wound electrode unit illustrated in FIG. 1.

FIG. 1 illustrates the cross sectional configuration of the nonaqueous electrolyte battery of Second Embodiment. FIG. 2 is a partial magnified view of a wound electrode unit 20 shown in FIG. 1. The nonaqueous electrolyte battery is a lithium ion secondary battery in which, for example, the negative electrode capacity is represented based on the storage and release of the electrode reaction substance lithium.

Overall Configuration of Nonaqueous Electrolyte Battery

The nonaqueous electrolyte battery is structured to include primarily a substantially hollow cylindrical battery canister 11, a wound electrode unit 20 including a positive electrode 21 and a negative electrode 22 wound around with a separator 23 laminated in between, and a pair of insulating plates 12 and 13. The wound electrode unit 20 and the insulating plates 12 and 13 are housed inside the cylindrical battery canister 11. The battery structure using such a cylindrical battery canister 11 is called a cylindrical structure.

The battery canister 11 is made of, for example, nickel (Ni)-plated iron (Fe), and has a closed end and an open end. Inside the battery canister 11, the insulating plates 12 and 13 are disposed on the both sides of the wound electrode unit 20, perpendicularly to the rolled surface.

The battery canister 11 is sealed with a battery lid 14 fastened to the open end of the battery canister 11 by swaging via a gasket 17, together with a safety valve mechanism 15 and a heat-sensitive resistive element (PTC: Positive Temperature Coefficient) 16 provided inside the battery lid 14.

The battery lid 14 is formed using, for example, the same or similar materials used for the battery canister 11. The safety valve mechanism 15 is electrically connected to the battery lid 14 via the heat-sensitive resistive element 16, and cuts off the electrical connection between the battery lid 14 and the wound electrode unit 20 by the inversion of a disk plate 15A, when the pressure inside the battery reaches a certain level as a result of internal shorting or external heat.

The heat-sensitive resistive element 16 increases its resistance value under elevated temperatures, and restricts current to prevent abnormal heating due to overcurrent. The gasket 17 is formed using, for example, insulating material, and is asphalt-coated.

A center pin 24 is inserted at, for example, the center of the wound electrode unit 20. The positive electrode 21 of the wound electrode unit 20 is connected to a positive electrode lead 25 of, for example, aluminum (Al), and the negative electrode 22 is connected to a negative electrode lead 26 of, for example, nickel (Ni). The positive electrode lead 25 is electrically connected to the battery lid 14 by being welded to the safety valve mechanism 15. The negative electrode lead 26 is electrically connected to the battery canister 11 by being welded thereto.

Positive Electrode

The positive electrode 21 is structured to include, for example, a positive electrode active material layer 21B provided on the both sides of a positive electrode collector 21A having a pair of faces. The positive electrode active material layer 21B may be provided only on one side of the positive electrode collector 21A. On the positive electrode surface, the nitrile group of the nitrile group-containing hydrocarbon compound contained in the nonaqueous electrolyte is coordinatively adsorbed on the active spot metal surface of the positive electrode active material, and the reactivity between the positive electrode and the electrolyte is lowered.

The positive electrode collector 21A is configured from metallic material, for example, such as aluminum, nickel, and stainless steel.

The positive electrode active material layer 21B includes positive electrode active material, which is one or more positive electrode materials capable of storing and releasing lithium. Other materials such as a binder and a conductive agent also may be contained, as required.

Preferred examples of the positive electrode material that can store and release lithium include lithium-containing compounds, for their ability to provide high energy density. Examples of lithium-containing compounds include composite oxides that include lithium and transition metal elements; and phosphoric acid compounds that include lithium and transition metal elements. Of these, compounds including at least one transition metal element selected from cobalt, nickel, manganese, and iron are preferred for their ability to provide high voltage.

Examples of composite oxides that include lithium and transition metal elements include lithium cobalt composite oxide ($Li_xCoO_2$), lithium nickel composite oxide ($Li_xNiO_2$), lithium nickel cobalt composite oxide ($Li_xNi_{1-z}CO_zO_2$ (z<1)), lithium nickel cobalt manganese composite oxide ($Li_xNi_{(1-v-w)}Co_vMn_wO_2$ (v+w<1)), and lithium manganese composite oxide ($LiMn_2O_4$) or lithium manganese nickel composite oxide ($LiMn_{2-t}Ni_tO_4$ (t<2)) of a spinel-type structure. Of these, cobalt-containing composite oxides are preferred for their ability to provide high capacity and excellent cycle characteristics. Examples of phosphoric acid compounds that include lithium and transition metal elements include lithium iron phosphate compounds ($LiFePO_4$), and lithium iron manganese phosphate compounds ($LiFe_{1-u}Mn_uPO_4$ (u<1)).

Further, from the standpoint of providing even higher electrode chargeability and cycle characteristics, composite particles may be used that are produced by coating the surface of the core particles of any of the foregoing lithium-containing compounds with fine particles of other lithium-containing compounds.

Other examples of the positive electrode material that can store and release lithium include: oxides such as titanium oxide, vanadium oxide, and manganese dioxide; disulfides such as titanium disulfide and molybdenum sulfide; chalcogenides such as niobium selenide; sulfur; and conductive polymers such as polyaniline and polythiophene. The positive electrode material that can store and release lithium may be other than these examples. Further, positive electrode materials such as those exemplified above may be used as a mixture of any combination of two or more.

Negative Electrode

The negative electrode 22 is structured to include, for example, a negative electrode active material layer 22B provided on the both sides of a negative electrode collector 22A having a pair of faces. The negative electrode active material layer 22B may be provided only on one side of the negative electrode collector 22A. A coating that originates from at least one of the heteropolyacids and heteropolyacid compounds represented by formulae (I) to (IV) is formed on the negative electrode surface. The coating includes a deposit of a three-dimensional mesh structure formed by the electrolysis of the heteropolyacid compound in response to preliminary charging or charging. The coating is formed on at least a portion of the negative electrode surface, and includes an amorphous polyacid and/or polyacid compound that contain one or more polyelements. The amorphous polyacid and/or polyacid compound exists in a gel state with the nonaqueous electrolyte.

Further, because the nonaqueous electrolyte contains the nitrile compound, the nitrile compound is coordinatively adsorbed also on the coating that originates from at least one of the heteropolyacid and heteropolyacid compound of formulae (I) to (IV), and the reactivity between the negative electrode and the electrolyte can be lowered over extended time periods.

Figure 3:
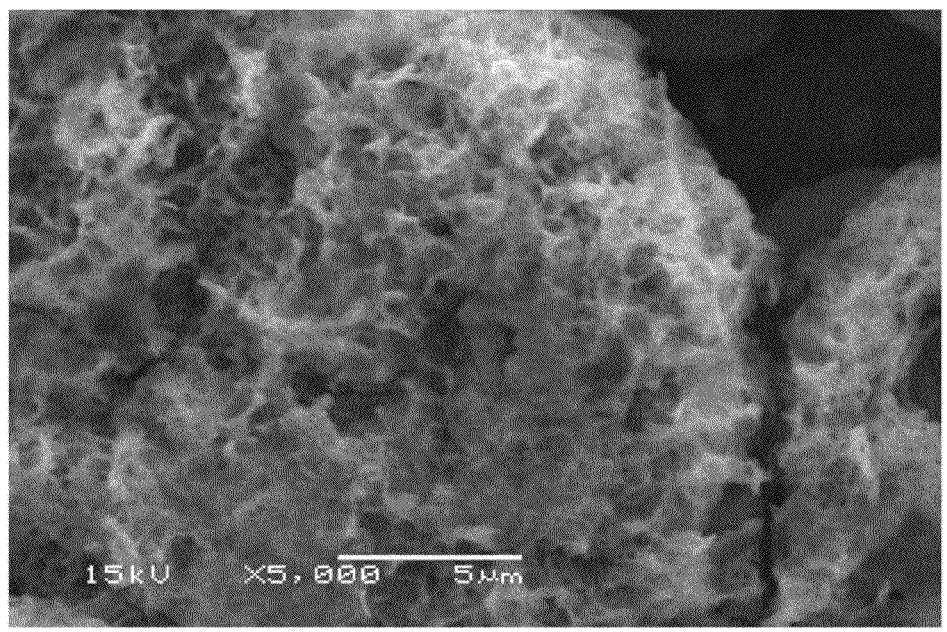
FIG. 3 is a SEM photographic view of a negative electrode surface according to an embodiment.

The gel coating of the embodiment formed on the negative electrode surface and including an amorphous polyacid and/or polyacid compound of one or more polyacid elements can be observed with a SEM (Scanning Electron Microscope), for example, as shown in FIG. 3. Note that FIG. 3 is a SEM image of the negative electrode surface after charging, taken after removing the nonaqueous electrolyte by washing, followed by drying.

The presence or absence of the deposition of the amorphous polyacid and/or polyacid compound can be confirmed based on the structure analysis performed by the X-ray absorption fine structure (XAFS) analysis of the coating formed on the negative electrode surface, and from the chemical information of molecules obtained by time-of-flight secondary ion mass spectrometry (ToF-SIMS).

Figure 4:
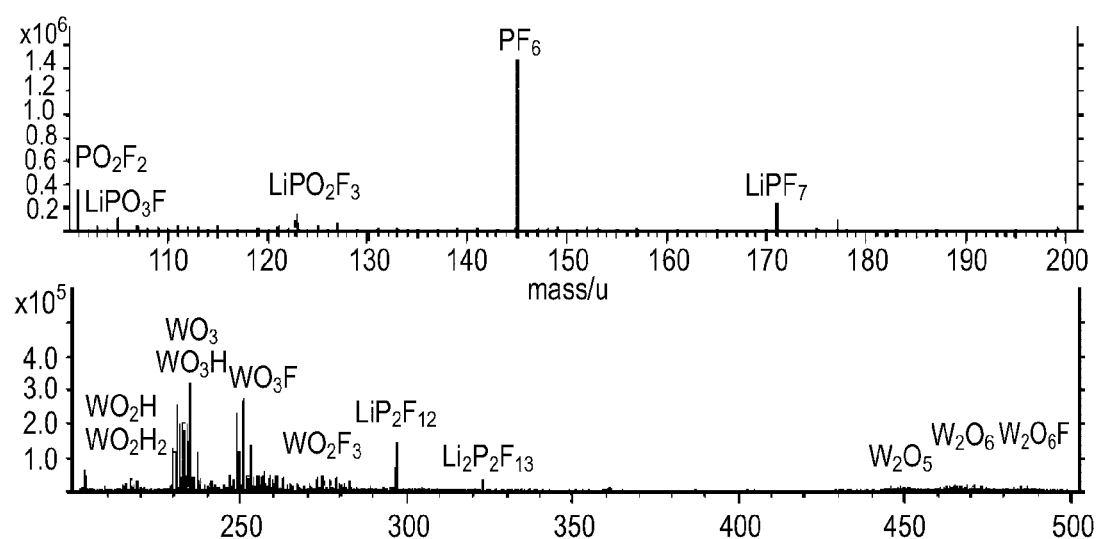
FIG. 4 represents an example of a secondary ion spectrum obtained by the time-of-flight secondary ion mass spectrometry (ToF-SIMS) on a negative electrode surface presenting a deposit formed by adding silicotungstic acid to the battery system.

FIG. 4 represents an example of a secondary ion spectrum obtained by the time-of-flight secondary ion mass spectrometry (ToF-SIMS) of the negative electrode surface of a nonaqueous electrolyte battery that includes the negative electrode coating of the embodiment formed by charging the battery after adding silicotungstic acid to the battery system. As can be seen in FIG. 4, molecules that contain tungsten (W) and oxygen (O) as the constituting elements are present.

Figure 5:
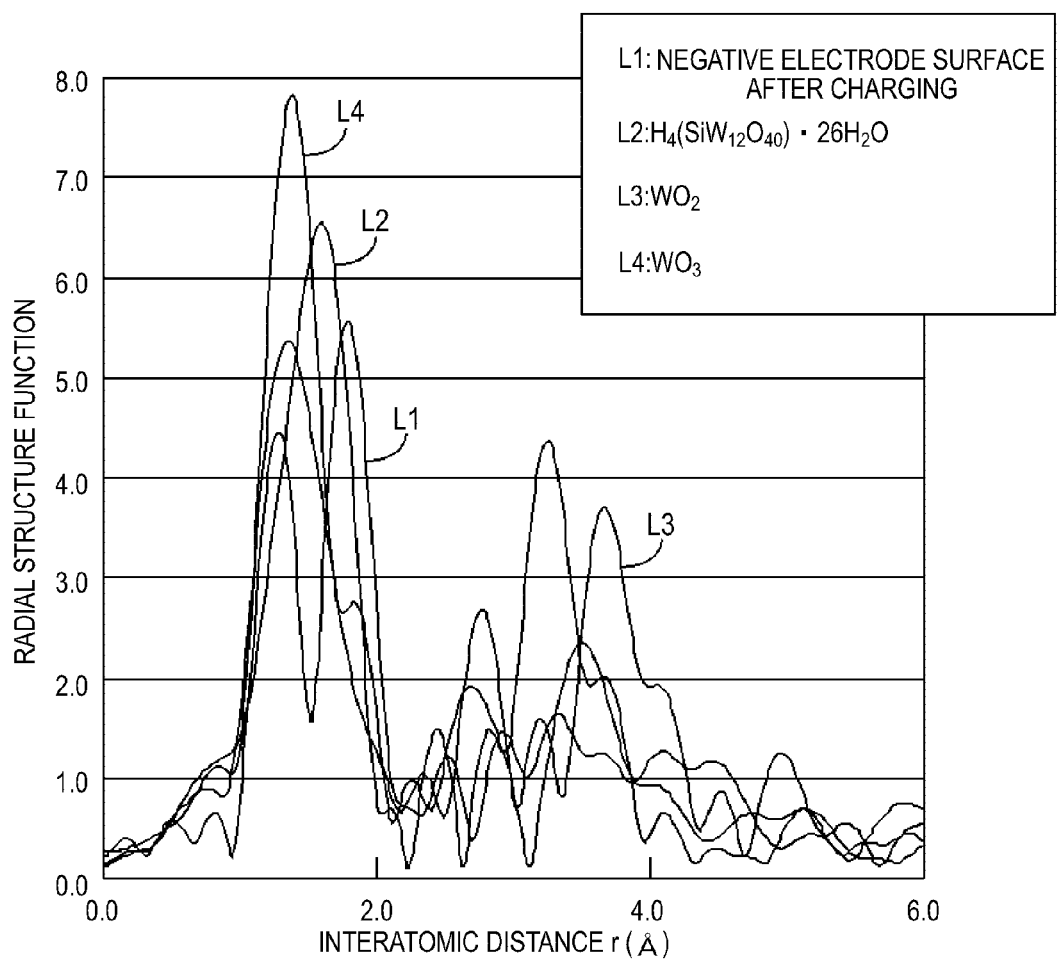
FIG. 5 represents an example of a W—O bond radial structure function obtained by the Fourier transformation of the spectrum from the X-ray absorption fine structure (XAFS) analysis of a negative electrode surface presenting a deposit formed by adding silicotungstic acid to the battery system.

FIG. 5 represents an example of a W—O bond radial structure function obtained by the Fourier transformation of the spectrum from the X-ray absorption fine structure (XAFS) analysis of the negative electrode surface of a nonaqueous electrolyte battery that includes a negative electrode coating of the embodiment formed by charging the battery after adding silicotungstic acid to the battery system. Along with the analysis result of the negative electrode coating, FIG. 5 also represents an example of radial structure functions for the W—O bonds of tungstic acid ($WO_3$, $WO_2$) and silicotungstic acid ($H_4(SiW_{12}O_{40}).26H_2O$) usable as the polyacid and heteropolyacid, respectively, of the embodiment.

It can be seen from FIG. 5 that the peak L1 of the deposit on the negative electrode surface occurs at a different position from the peaks L2, L3, and L4 of the silicotungstic acid ($H_4(SiW_{12}O_{40}).26H_2O$), tungsten dioxide ($WO_2$), and tungsten trioxide ($WO_3$), showing that the deposits have different structures. It can be confirmed from the radial structure functions that the main peaks are present in the 1.0 to 2.0 Å range, and other peaks in the 2.0 to 4.0 Å range in the typical tungsten oxides tungsten trioxide ($WO_3$) and tungsten dioxide ($WO_2$), and in the starting substance silicotungstic acid ($H_4(SiW_{12}O_{40}).26H_2O$) of the embodiment.

On the other hand, the W-O bond distance distribution of the polyacid containing the main component tungstic acid and deposited on the positive and negative electrodes in the embodiment does not have a distinct peak comparative to peak L1 outside the 1.0 to 2.0 Å range, though peaks occur in this range. Specifically, substantially no peak is observed above 3.0 Å. The result thus confirms that the deposit on the negative electrode surface is indeed amorphous.

The negative electrode collector 22A is configured from metallic material, for example, such as copper, nickel, and stainless steel.

The negative electrode active material layer 22B includes a negative electrode active material, which may be one or more negative electrode materials capable of storing and releasing lithium. Other materials such as a binder and a conductive agent also may be contained, as required. The chargeable capacity of the negative electrode material that can store and release lithium is preferably greater than the discharge capacity of the positive electrode. Note that the specifics of the binder and the conductive agent are as described in conjunction with the positive electrode.

The negative electrode material that can store and release lithium may be, for example, carbon material. Examples of carbon material include easily graphitizable carbon, non-graphitizable carbon having a (002) plane distance of 0.37 nm or more, and graphite having a (002) plane distance of 0.34 nm or less. Specific examples include pyrolyzed carbons, cokes, glass-like carbon fibers, organic polymer compound calcined products, activated carbons, and carbon blacks. Cokes include pitch cokes, needle cokes, and petroleum cokes. The organic polymer compound calcined products refer to carbonized products obtained by calcining phenol resin, furan resin, or the like at appropriate temperatures. Carbon materials are preferred because they undergo a very few changes in crystal structure in the storage and release of lithium, and thus provide high energy density and excellent cycle characteristics, in addition to serving as conductive agents. The carbon material may be fibrous, spherical, granular, or scale-like in shape.

Aside from the carbon material, the negative electrode material that can store and release lithium may be, for example, material that, in addition to being capable of storing and releasing lithium, includes at least one of a metallic element and a semi-metallic element as the constituting element, because such materials also provide high energy density. Such negative electrode materials may include a metallic element or a semi-metallic element either alone or as an alloy or a compound, or may at least partially include one or more phases of these. As used herein, the "alloy" encompasses an alloy or two or more metallic elements, and an alloy of one or more metallic elements and one or more semi-metallic elements. Further, the "alloy" may include a non-metallic element. The composition may be a solid solution, a eutectic (eutectic mixture), or an intermetallic compound, or a mixture of two or more of these.

The metallic and semi-metallic elements are, for example, those capable of forming an alloy with lithium. Specific examples include magnesium (Mg), boron (B), aluminum (Al), gallium (Ga), indium (In), silicon (Si), germanium (Ge), tin (Sn), lead (Pb), bismuth (Bi), cadmium (Cd), silver (Ag), zinc (Zn), hafnium (Hf), zirconium (Zr), yttrium (Y), palladium (Pd), and platinum (Pt). At least one of silicon and tin is preferable, and silicon is more preferable, because these elements are highly capable of storing and releasing lithium, and can provide high energy density.

Examples of negative electrode material that includes at least one of silicon and tin include silicon, either alone or as an alloy or a compound, tin, either alone or as an alloy or a compound, and materials that at least partially include one or more phases of these.

Examples of silicon alloy include those including at least one non-silicon second constituting element selected from tin (Sn), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb), and chromium (Cr). Examples of tin alloy include those including at least one non-tin (Sn) second constituting element selected from silicon (Si), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb), and chromium (Cr).

Examples of tin compound and silicon compound include those containing, for example, oxygen (O) or carbon (C). The tin compound and the silicon compound may optionally include the second constituting elements exemplified above, in addition to tin (Sn) or silicon (Si).

Particularly preferred as the negative electrode material that includes at least one of silicon (Si) and tin (Sn) is, for example, a material that includes tin (Sn) as a first constituting element, and a second and a third constituting element in addition to first constituting element tin (Sn). The negative electrode material may be used together with the negative electrode materials exemplified above. The second constituting element is at least one selected from cobalt (Co), iron (Fe), magnesium (Mg), titanium (Ti), vanadium (V), chromium (Cr), manganese (Mn), nickel (Ni), copper (Cu), zinc (Zn), gallium (Ga), zirconium (Zr), niobium (Nb), molybdenum (Mo), silver (Ag), indium (In), cerium (Ce), hafnium (Hf), tantalum (Ta), tungsten (W), bismuth (Bi), and silicon (Si). The third constituting element is at least one selected from boron (B), carbon (C), aluminum (Al), and phosphorus (P). Inclusion of the second and third elements improves cycle characteristics.

A CoSnC-containing material is particularly preferable that includes tin (Sn), cobalt (Co), and carbon (C) as the constituting elements, and in which the carbon (C) content ranges from 9.9 mass % to 29.7 mass %, inclusive, and in which the proportion of cobalt (Co) in the total of tin (Sn) and cobalt (Co) (Co/(Sn+Co)) ranges from 30 mass % to 70 mass %, inclusive. High energy density and excellent cycle characteristics can be obtained with these composition ranges.

The SnCoC-containing material may optionally include other constituting elements, as required. Preferred examples of other constituting elements include silicon (Si), iron (Fe), nickel (Ni), chromium (Cr), indium (In), niobium (Nb), germanium (Ge), titanium (Ti), molybdenum (Mo), aluminum (Al), phosphorus (P), gallium (Ga), and bismuth (Bi), which may be contained in combinations of two or more. Inclusion of these elements further improves capacity characteristics or cycle characteristics.

It is preferable that the SnCoC-containing material include a tin (Sn)-, cobalt (Co)-, and carbon (C)-containing phase, and that this phase have a low-crystalline or amorphous structure. Further, in the SnCoC-containing material, it is preferable that the constituting element carbon at least partially bind to the other constituting elements, namely, metallic elements or semi-metallic elements. Bonding of the carbon with other elements suppresses agglomeration or crystallization of tin (Sn) or other elements, which is considered to lower cycle characteristics.

The state of element binding can be measured by, for example, X-ray photoelectron spectroscopy (XPS). In XPS, the peak of the carbon 1s orbital (C1s) appears at 284.5 eV for graphite, when the device used is calibrated to provide a peak of the gold atom 4f orbital (Au4f) at 84.0 eV. The peak appears at 284.8 eV in surface-contaminated carbon. In contrast, when the carbon element charge density is high as in, for example, the carbon binding to a metallic element or a semi-metallic element, the C1s peak appears in a region below 284.5 eV. That is, when the C1s synthetic wave peak for SnCoC-containing material appears in a region below 284.5 eV, the carbon (C) contained in the SnCoC-containing material is at least partially binding to the other constituting elements, namely, the metallic element or the semi-metallic element.

Note that XPS uses, for example, a C1s peak for the calibration of the spectral energy axis. Generally, because the surface-contaminated carbon is present on the surface, the C1s peak of the surface-contaminated carbon is set to 284.8 eV, and used as the reference energy. In XPS, because the waveform of the C1s peak is obtained as the waveform that contains the peak of the surface-contaminated carbon and the peak of the carbon contained in the SnCoC-containing material, the peak of the surface-contaminated carbon and the peak of the carbon contained in the SnCoC-containing material are separated using, for example, commercially available software. In the waveform analysis, the position of the main peak on the lowest binding energy side is used as the reference energy (284.8 eV).

Other examples of the negative electrode material that can store and release lithium include metal oxides and polymer compounds that are capable of storing and releasing lithium. Examples of such metal oxides include iron oxide, ruthenium oxide, and molybdenum oxide. Examples of such polymer compounds include polyacetylene, polyaniline, and polypyrrole.

The negative electrode material that can store and release lithium may be other than these examples. Further, negative electrode materials such as those exemplified above may be used as a mixture of any combination of two or more.

The negative electrode active material layer 22B may be formed using, for example, any of a vapor-phase method, a liquid-phase method, a spray method, a calcining method, and coating, either individually or in combinations of two or more. When forming the negative electrode active material layer 22B using a vapor-phase method, a liquid-phase method, a spray method, or a calcining method, either individually or in combinations of two or more, it is preferable that an alloy be formed at least a portion of the interface between the negative electrode active material layer 22B and the negative electrode collector 22A. Specifically, it is preferable that the constituting elements of the negative electrode collector 22A diffuse into the negative electrode active material layer 22B at the interface, or the constituting elements of the negative electrode active material layer 22B diffuse into the negative electrode collector 22A at the interface. Further, these constituting elements preferably diffuse into the other layer between the negative electrode collector 22A and the negative electrode active material layer 22B. In this way, destruction caused by the expansion and contraction of the negative electrode active material layer 22B due to charge and discharge can be suppressed, and the electron conductivity between the negative electrode active material layer 22B and the negative electrode collector 22A can be improved.

The vapor-phase method may be, for example, a physical deposition method or a chemical deposition method, specifically, a vacuum deposition method, a sputter method, an ion plating method, a laser abrasion method, a chemical vapor deposition (CVD) method, or a plasma chemical vapor deposition method. Known techniques such as electroplating and non-electrolytic plating can be used as the liquid-phase method. The calcining method is a method in which, for example, a particulate negative electrode active material is mixed with other components such as a binder, dispersed in a solvent, and coated before it is subjected to a heat treatment at a temperature higher than the melting point of, for example, the binder. The calcining method also can be performed using known techniques, for example, such as an atmosphere calcining method, a reactive calcining method, and a hot-press calcining method.

Separator

The separator 23 is provided to isolate the positive electrode 21 and the negative electrode 22 from each other, and allows for passage of lithium ions while preventing current shorting caused by contacting of the electrodes. The separator 23 is configured using, for example, a porous film of synthetic resin such as polytetrafluoroethylene, polypropylene, and polyethylene, or a ceramic porous film. The separator 23 may be a laminate of two or more of these porous films. Other examples of separator material include polyvinylidene fluoride, aramid, polyimide, and polyacrylonitrile. These may be used either alone, or as a mixture or a polymer of two or more. The separator 23 is impregnated with the nonaqueous electrolyte of First Embodiment described above.

(2-2) Producing Method of Nonaqueous Electrolyte Battery

The nonaqueous electrolyte battery can be produced as follows.

Production of Positive Electrode

The fabrication begins with the positive electrode 21. For example, the positive electrode material, the binder, and the conductive agent are mixed to obtain a positive electrode mixture, which is then dispersed in an organic solvent, and formed into a paste positive electrode mixture slurry. The positive electrode mixture slurry is then evenly coated over the both surfaces of the positive electrode collector 21A using, for example, a doctor blade or a bar coater. After drying, the coating is compression molded using, for example, a roller press machine under optionally applied heat, and the positive electrode active material layer 21B is formed. The compression molding may be repeated multiple times.

Production of Negative Electrode

The negative electrode 22 is fabricated next. For example, the negative electrode material, the binder, and, optionally, the conductive agent are mixed to obtain a negative electrode mixture, which is then dispersed in an organic solvent, and formed into a paste negative electrode mixture slurry. The negative electrode mixture slurry is evenly coated over the both surfaces of the negative electrode collector 22A using, for example, a doctor blade or a bar coater. After drying, the coating is compression molded using, for example, a roller press machine under optionally applied heat, and the negative electrode active material layer 22B is formed.

Assembly of Nonaqueous Electrolyte Battery

The positive electrode lead 25 and the negative electrode lead 26 are attached to the positive electrode collector 21A and to the negative electrode collector 22A, respectively, by, for example, welding. The positive electrode 21 and the negative electrode 22 are then wound around via the separator 23, and the positive electrode lead 25 and the negative electrode lead 26 are welded at the front end to the safety valve mechanism 15 and to the battery canister 11, respectively. The roll of the positive electrode 21 and the negative electrode 22 is then sandwiched between the insulating plates 12 and 13, and housed inside the battery canister 11. With the positive electrode 21 and the negative electrode 22 housed inside the battery canister 11, the nonaqueous electrolyte of First Embodiment is injected into the battery canister 11, and the separator 23 is impregnated with the electrolyte. The battery lid 14, the safety valve mechanism 15, and the heat-sensitive resistive element 16 are then fastened to the open end of the battery canister 11 by swaging via the gasket 17. As a result, the nonaqueous electrolyte battery shown in FIG. 1 is obtained.

Further, at least one of the heteropolyacids and heteropolyacid compounds of formulae (I) to (IV) undergoes electrolysis and deposits to form a coating on the negative electrode surface. The heteropolyacid compound of any of formulae (I) to (IV) is capable of the insertion and desorption of lithium ions, and thus by being contained in the nonaqueous electrolyte, the heteropolyacid compound forms a stable SEI coating on the negative electrode in response to the charge and discharge in initial use, and suppresses the decomposition of the solvent and the electrolyte salt in the nonaqueous electrolyte. The SEI formed by the heteropolyacid and/or heteropolyacid compound is inorganic and strong, and has a small resistance for the insertion and desorption of lithium ions. It is therefore considered that the SEI is unlikely to cause adverse effects such as capacity deterioration. Further, the monofluorophosphate and/or difluorophosphate, similar to the lithium salt in the nonaqueous electrolyte, added with the heteropolyacid and/or heteropolyacid compound are considered to further suppress the decomposition of the electrolyte salt, and form a low-resistant SEI.

The nonaqueous electrolyte of the embodiment impregnates the negative electrode active material layer 22B, and thus a compound that originates from at least one of the heteropolyacids and heteropolyacid compounds of formulae (I) to (IV) may deposit in the negative electrode active material layer 22B in response to charging or preliminary charging. Specifically, a compound that originates from at least one of the heteropolyacids and heteropolyacid compounds of formulae (I) to (IV) may be present between the negative electrode active material particles.

The presence or absence of the compound that originates from at least one of the heteropolyacids and heteropolyacid compounds of formulae (I) to (IV) in the negative electrode coating can be confirmed by, for example, X-ray photoemission spectroscopy (XPS) analysis or time-of-flight secondary ion mass spectrometry (ToF-SIMS). In this case, the battery is washed with dimethyl carbonate after disassembling the battery. The battery is washed to remove the low volatile solvent component and the electrolyte salt present on the surface. Preferably, sampling is performed in an inert atmosphere as much as possible.

Advantages

In Second Embodiment, the nonaqueous electrolyte includes the nitrile group-containing hydrocarbon compound, and at least one of the heteropolyacids and heteropolyacid compounds of formulae (I) to (IV). In this way, the deterioration of battery characteristics under high-temperature environment can be suppressed, and the side reaction of the electrode active material and the nonaqueous electrolyte can be suppressed during continued use. As a result, the battery characteristics improve. Because the addition of the nitrile group-containing hydrocarbon compound and heteropolyacid compound in the present disclosure is also effective for use under high-temperature environment, the present disclosure is applicable to both primary and secondary batteries. Preferably, the present disclosure is used for secondary batteries, because the present disclosure is more effective in batteries with many charge and discharge cycles.

3. Third Embodiment

A nonaqueous electrolyte battery according to Third Embodiment is described below. The nonaqueous electrolyte battery of Third Embodiment is a laminate film-type nonaqueous electrolyte battery with the laminate film exterior.

(3-1) Configuration of Nonaqueous Electrolyte Battery

Figure 6:
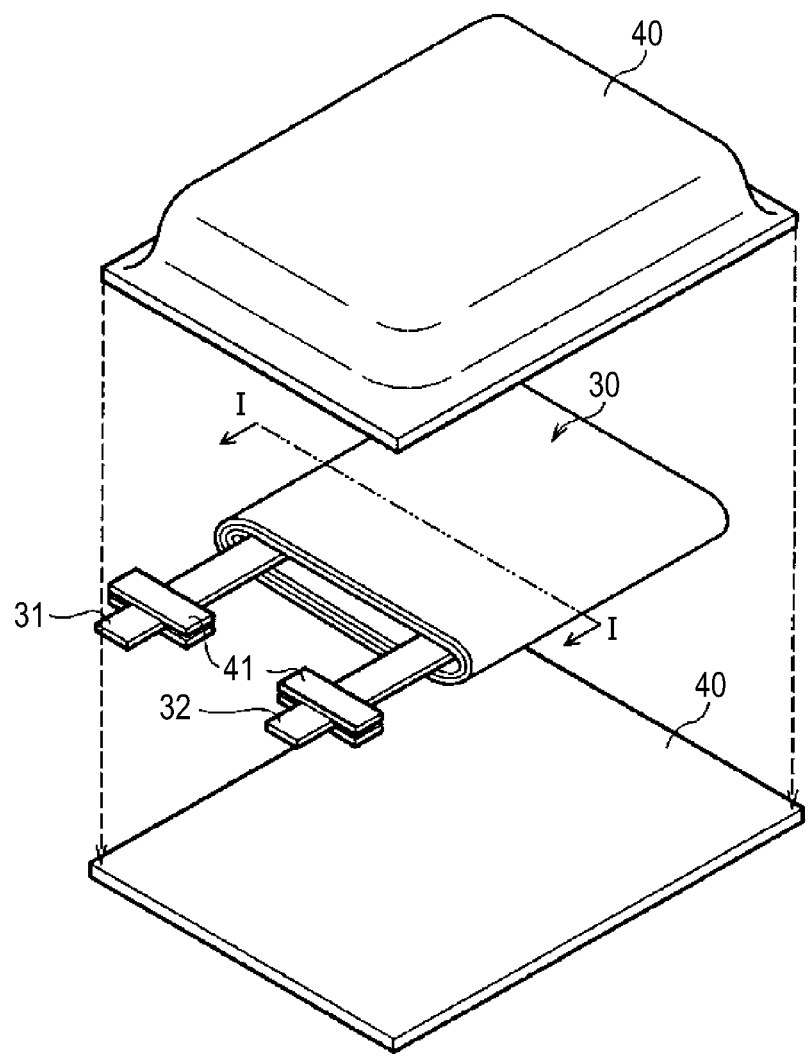
FIG. 6 is an exploded perspective view illustrating an exemplary configuration of a nonaqueous electrolyte battery according to another embodiment.
Figure 7:
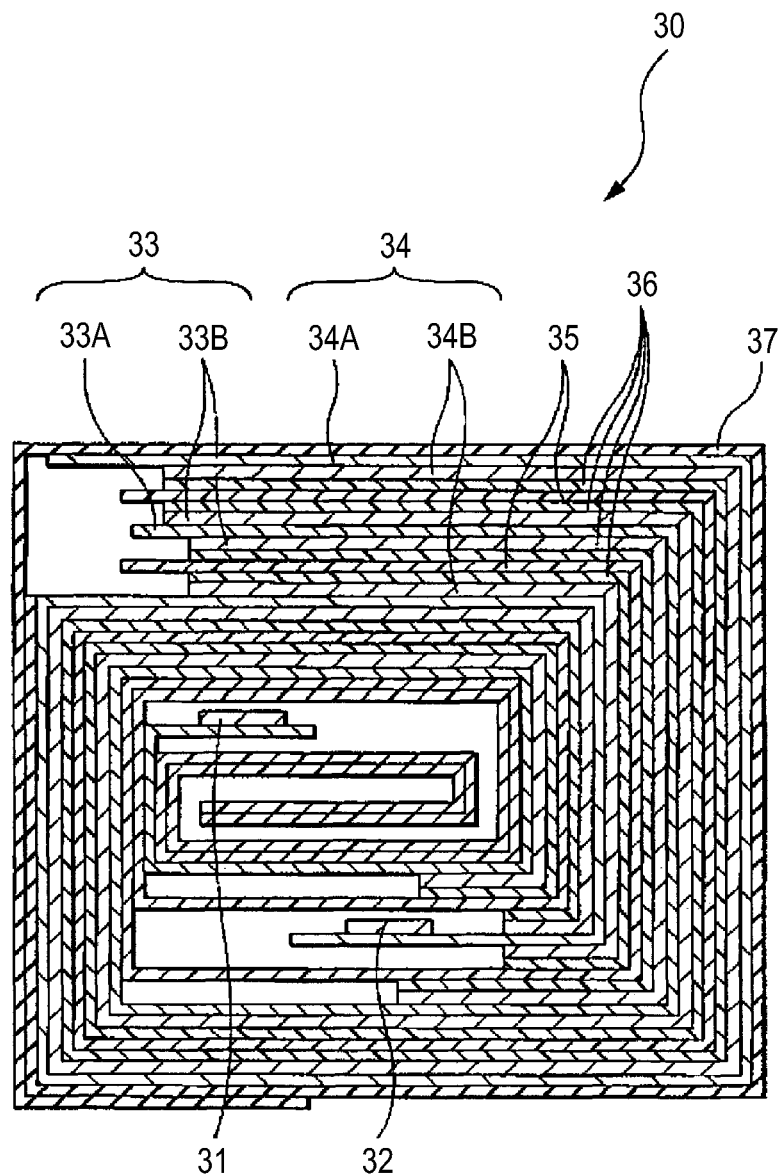
FIG. 7 is a cross sectional view of the wound electrode unit of FIG. 6 taken along the line I-I.

A nonaqueous electrolyte battery according to Third Embodiment is described. FIG. 6 is an exploded perspective view representing a configuration of the nonaqueous electrolyte battery according to Third Embodiment. FIG. 7 is a magnified cross sectional view of a wound electrode unit 30 of FIG. 6 at the line I-I.

The nonaqueous electrolyte battery is basically structured to include a film-like exterior member 40, and a wound electrode unit 30 housed in the exterior member 40 with a positive electrode lead 31 and a negative electrode lead 32 attached to the wound electrode unit 30. The battery structure using the film-like exterior member 40 is called a laminate film structure.

For example, the positive electrode lead 31 and the negative electrode lead 32 lead out in the same direction out of the exterior member 40. The positive electrode lead 31 is formed using, for example, metallic material such as aluminum. The negative electrode lead 32 is formed using, for example, metallic material such as copper, nickel, and stainless steel. These metallic materials are formed into, for example, a thin plate or a mesh.

The exterior member 40 is formed using, for example, an aluminum laminate film that includes a nylon film, an aluminum foil, and a polyethylene film laminated in this order. For example, the exterior member 40 is structured from a pair of rectangular aluminum laminate films fused or bonded with an adhesive at the peripheries with the polyethylene films facing the wound electrode unit 30.

An adhesive film 41 that prevents entry of external air is inserted between the exterior member 40 and the positive and negative electrode leads 31 and 32. The adhesive film 41 is configured using a material that has adhesion to the positive electrode lead 31 and the negative electrode lead 32. Examples of such material include polyolefin resins such as polyethylene, polypropylene, modified-polyethylene, and modified-polypropylene.

The exterior member 40 may be configured from laminate films of other laminate structures, instead of the aluminum laminate film, or from a polypropylene or other polymer films, or metal films.

FIG. 7 is a cross section of the wound electrode unit 30 of FIG. 6, taken along the line I-I. The wound electrode unit 30 is a wound unit of a positive electrode 33 and a negative electrode 34 laminated via a separator 35 and an electrolyte 36. The outermost periphery of the wound electrode unit 30 is protected by a protective tape 37.

The positive electrode 33 is structured to include, for example, a positive electrode active material layer 33B on the both sides of a positive electrode collector 33A, and the nitrile compound is coordinatively adsorbed on the active spot metal surface of the positive electrode active material on the positive electrode surface.

The negative electrode 34 is structured to include, for example, a negative electrode active material layer 34B on the both sides of a negative electrode collector 34A, and a coating that originates from at least one of the heteropolyacids and heteropolyacid compounds of formulae (I) to (IV) is formed on the negative electrode surface. The heteropolyacid compound coating is a deposit of a three-dimensional mesh structure formed by the electrolysis of the heteropolyacid compound, and exists as a gel coating that contains amorphous polyacid with the nonaqueous electrolyte in this structure in the battery system. Further, the nitrile compound is coordinatively adsorbed also on the coating that originates from at least one of the heteropolyacid and heteropolyacid compound of formulae (I) to (IV).

The positive electrode 33 and the negative electrode 34 are disposed in such a manner that the negative electrode active material layer 34B and the positive electrode active material layer 33B are on the opposite sides. The positive electrode collector 33A, the positive electrode active material layer 33B, the negative electrode collector 34A, the negative electrode active material layer 34B, and the separator 35 are configured the same way as the positive electrode collector 21A, the positive electrode active material layer 21B, the negative electrode collector 22A, the negative electrode active material layer 22B, and the separator 23 of Second Embodiment.

The electrolyte 36 is a so-called gel electrolyte, including the nonaqueous electrolyte of First Embodiment, and a polymer compound that retains the nonaqueous electrolyte. The gel electrolyte is preferable, because it provides high ion conductivity (for example, 1 mS/cm or more at room temperature), and prevents leaking.

(3-2) Producing Method of Nonaqueous Electrolyte Battery

The nonaqueous electrolyte battery is produced using, for example, three producing methods (first to third producing methods), as follows.

(3-2-1) First Producing Method

In the first producing method, for example, the positive electrode active material layer 33B is first formed on the both sides of the positive electrode collector 33A to form the positive electrode 33, according to the procedure used to form the positive electrode 21 and the negative electrode 22 in Second Embodiment. The negative electrode active material layer 34B is formed on the both sides of the negative electrode collector 34A to form the negative electrode 34.

A separately prepared precursor solution containing the nonaqueous electrolyte of First Embodiment, the polymer compound, and the solvent is coated over the positive electrode 33 and the negative electrode 34, and the solvent is evaporated to form the gel electrolyte 36. Then, the positive electrode lead 31 and the negative electrode lead 32 are attached to the positive electrode collector 33A and the negative electrode collector 34A, respectively.

The positive electrode 33 and the negative electrode 34 with the electrolyte 36 are then laminated via the separator 35, and wound along the longitudinal direction. The protective tape 37 is then bonded to the outermost periphery to fabricate the wound electrode unit 30. Finally, the wound electrode unit 30 is placed between, for example, a pair of film-like exterior members 40, and sealed therein by bonding the exterior members 40 at the peripheries by, for example, heatfusion. The adhesive film 41 is inserted between the positive and negative electrode leads 31 and 32 and the exterior members 40. This completes the nonaqueous electrolyte battery.

(3-2-2) Second Producing Method

In the second producing method, firstly, the positive electrode lead 31 and the negative electrode lead 32 are attached to the positive electrode 33 and the negative electrode 34, respectively. The positive electrode 33 and the negative electrode 34 are then laminated and wound around with the separator 35 in between, and the protective tape 37 is bonded to the outermost periphery to obtain a wound unit as a precursor of the wound electrode unit 30.

The wound unit is then placed between a pair of film-like exterior members 40, which are then bonded by, for example, heatfusion at the peripheries, leaving one side open. As a result, the wound unit is housed inside the bag of the exterior member 40. Then, an electrolyte composition is prepared that includes the nonaqueous electrolyte of First Embodiment, the raw material monomer of the polymer compound, a polymerization initiator, and optional materials such as a polymerization inhibitor, and the electrolyte composition is injected into the bag of the exterior member 40. The opening of the exterior member 40 is then sealed by, for example, heatfusion. Finally, the monomer is heat polymerized into the polymer compound, and the gel electrolyte 36 is formed. This completes the nonaqueous electrolyte battery.

(3-2-3) Third Producing Method

In the third producing method, a wound unit is formed and housed in the bag of the exterior member 40 in the same manner as in the second producing method, except that the polymer compound is coated on the both sides of the separator 35 in advance.

The polymer compound coated on the separator 35 may be, for example, a polymer that includes a vinylidene fluoride component, specifically, a homopolymer, a copolymer, or a multicomponent copolymer. Specific examples include polyvinylidene fluoride, binary copolymers that include vinylidene fluoride and hexafluoropropylene components, and ternary copolymers that include vinylidene fluoride, hexafluoropropylene, and chlorotrifluoroethylene components.

Note that the polymer compound may include one or more other polymer compounds, in addition to the polymer that includes a vinylidene fluoride component. Then, the nonaqueous electrolyte of First Embodiment is prepared, and injected into the exterior member 40, and the opening of the exterior member 40 is sealed by, for example, heatfusion. Finally, the exterior member 40 is heated under applied load to contact the separator 35 with the positive electrode 33 and the negative electrode 34 via the polymer compound. As a result, the nonaqueous electrolyte impregnates the polymer compound, causing the polymer compound to gel and form the electrolyte 36. This completes the nonaqueous electrolyte battery.

By the preliminary charging or charging of the nonaqueous electrolyte battery fabricated according to the first to third producing methods, a coating that originates from at least one of the heteropolyacids and heteropolyacid compounds of formulae (I) to (IV) is formed on the negative electrode surface.

Advantages

The effects obtained in Second Embodiment also can be obtained in Third Embodiment.

4. Fourth Embodiment

A nonaqueous electrolyte battery according to Fourth Embodiment is described below. The nonaqueous electrolyte battery of Fourth Embodiment is a laminate film-type nonaqueous electrolyte battery with the laminate film exterior, and does not differ from the nonaqueous electrolyte battery of Third Embodiment, except that the nonaqueous electrolyte of First Embodiment is directly used. Accordingly, the following description primarily deals with differences from Third Embodiment.

(4-1) Configuration of Nonaqueous Electrolyte Battery

The nonaqueous electrolyte battery according to Fourth Embodiment uses the nonaqueous electrolyte instead of the gel electrolyte 36. Thus, the wound electrode unit 30 does not include the electrolyte 36, and instead includes the nonaqueous electrolyte impregnating the separator 35.

(4-2) Producing Method of Nonaqueous Electrolyte Battery

The nonaqueous electrolyte battery can be produced, for example, as follows.

First, for example, the positive electrode active material, the binder, and the conductive agent are mixed to prepare a positive electrode mixture, which is then dispersed in a solvent such as N-methyl-2-pyrrolidone to obtain a positive electrode mixture slurry. The positive electrode mixture slurry coated on the both sides, dried, and compression molded to form the positive electrode active material layer 33B and obtain the positive electrode 33. Thereafter, for example, the positive electrode lead 31 is attached to the positive electrode collector 33A, for example, by ultrasonic welding or spot welding.

For example, the negative electrode material and the binder are mixed to prepare a negative electrode mixture, which is then dispersed in a solvent such as N-methyl-2-pyrrolidone to obtain a negative electrode mixture slurry. The negative electrode mixture slurry is coated on the both sides of the negative electrode collector 34A, dried, and compression molded to form the negative electrode active material layer 34B and obtain the negative electrode 34. Thereafter, for example, the negative electrode lead 32 is attached to the negative electrode collector 34A, for example, by ultrasonic welding or spot welding.

The positive electrode 33 and the negative electrode 34 are wound around with the separator 35 in between, and installed in the exterior member 40. The nonaqueous electrolyte of First Embodiment is then injected into the exterior member 40, and the exterior member 40 is sealed. As a result, the nonaqueous electrolyte battery shown in FIGS. 6 and 7 is obtained.

Advantages

The effects obtained in Second Embodiment also can be obtained in Fourth Embodiment.

5. Fifth Embodiment

An exemplary configuration of a nonaqueous electrolyte battery 20 according to Fifth Embodiment is described below.

Figure 8:
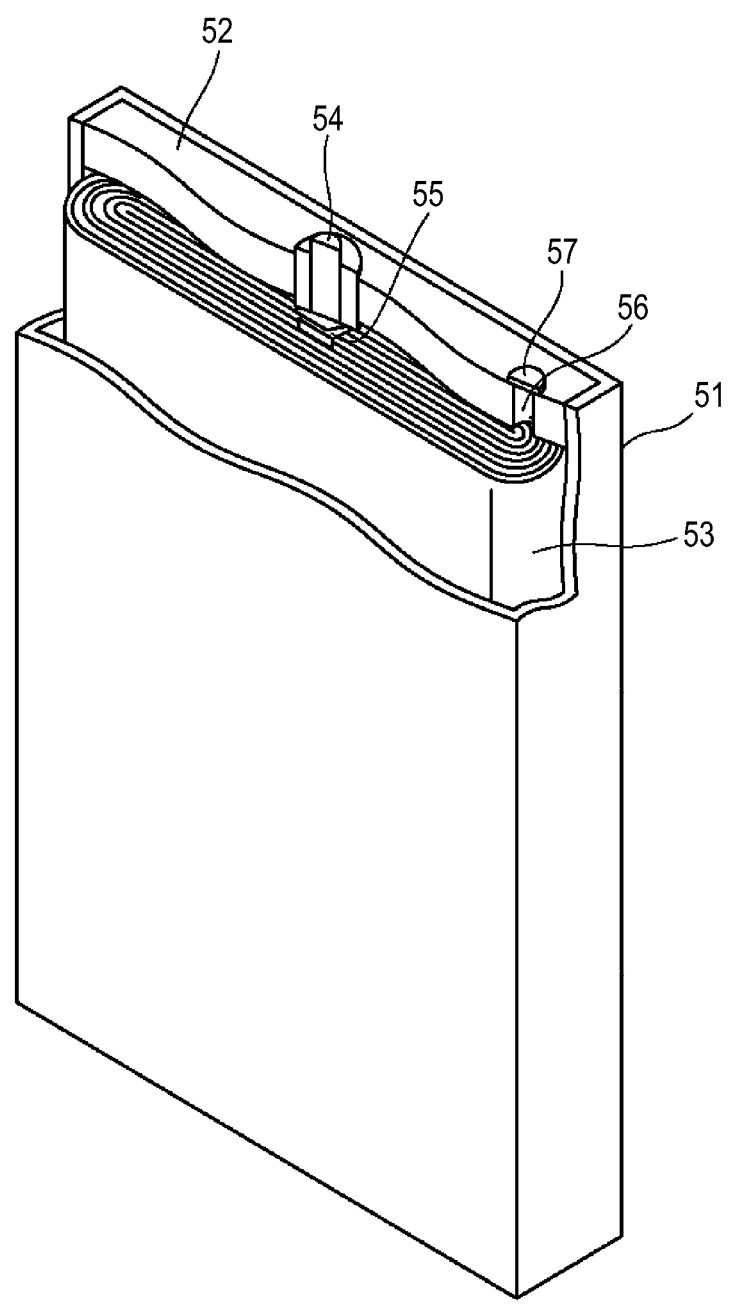
FIG. 8 is a cross sectional view representing another exemplary configuration of a nonaqueous electrolyte battery according to an embodiment.

The nonaqueous electrolyte battery 20 according to Fifth Embodiment has a rectangular shape, as illustrated in FIG. 8.

The nonaqueous electrolyte battery 20 is fabricated as follows. As illustrated in FIG. 8, first, a wound electrode unit 53 is housed in an exterior canister 51, a metallic rectangular canister made from metal, for example, such as aluminum (Al), and iron (Fe).

An electrode pin 54 provided on a battery lid 52 is then connected to an electrode terminal 55 leading out from the wound electrode unit 53, and a seal is made with the battery lid 52. Then, a nonaqueous electrolyte containing the nitrile compound and at least one of the heteropolyacids and heteropolyacid compounds of formulae (I) to (IV) is injected into the nonaqueous electrolyte through a nonaqueous electrolyte inlet 56, which is then sealed with a sealing member 57. In response to the charging or preliminary charging of the battery so fabricated, a compound that originates from at least one of the heteropolyacids and heteropolyacid compounds of formulae (I) to (IV) deposits on the surface of the negative electrode 14. This completes the nonaqueous electrolyte battery 20 of Fifth Embodiment.

Note that the wound electrode unit 53 is obtained by laminating the positive electrode and the negative electrode via the separator, and winding the electrodes. The positive electrode, the negative electrode, the separator, and the nonaqueous electrolyte are as described in First Embodiment, and will not be described further.

Advantages

The nonaqueous electrolyte battery 20 of Fifth Embodiment can suppress decreases in percentage remaining capacity, and gas production under high-temperature environment, and decreases in percentage remaining capacity during continued use. Thus, damages caused by increased inner pressure due to gas production, and lowering in battery characteristics can be prevented.

6. Sixth Embodiment

A nonaqueous electrolyte battery according to Sixth Embodiment is described below. The nonaqueous electrolyte battery according to Sixth Embodiment is a laminate film-type nonaqueous electrolyte battery in which the electrode unit as a laminate of the positive electrode and the negative electrode is sheathed with a laminate film. Sixth Embodiment does not differ from Third Embodiment except for the configuration of the electrode unit. Accordingly, the following description only deals with the electrode unit of Sixth Embodiment.

Positive Electrode and Negative Electrode

Figure 9:
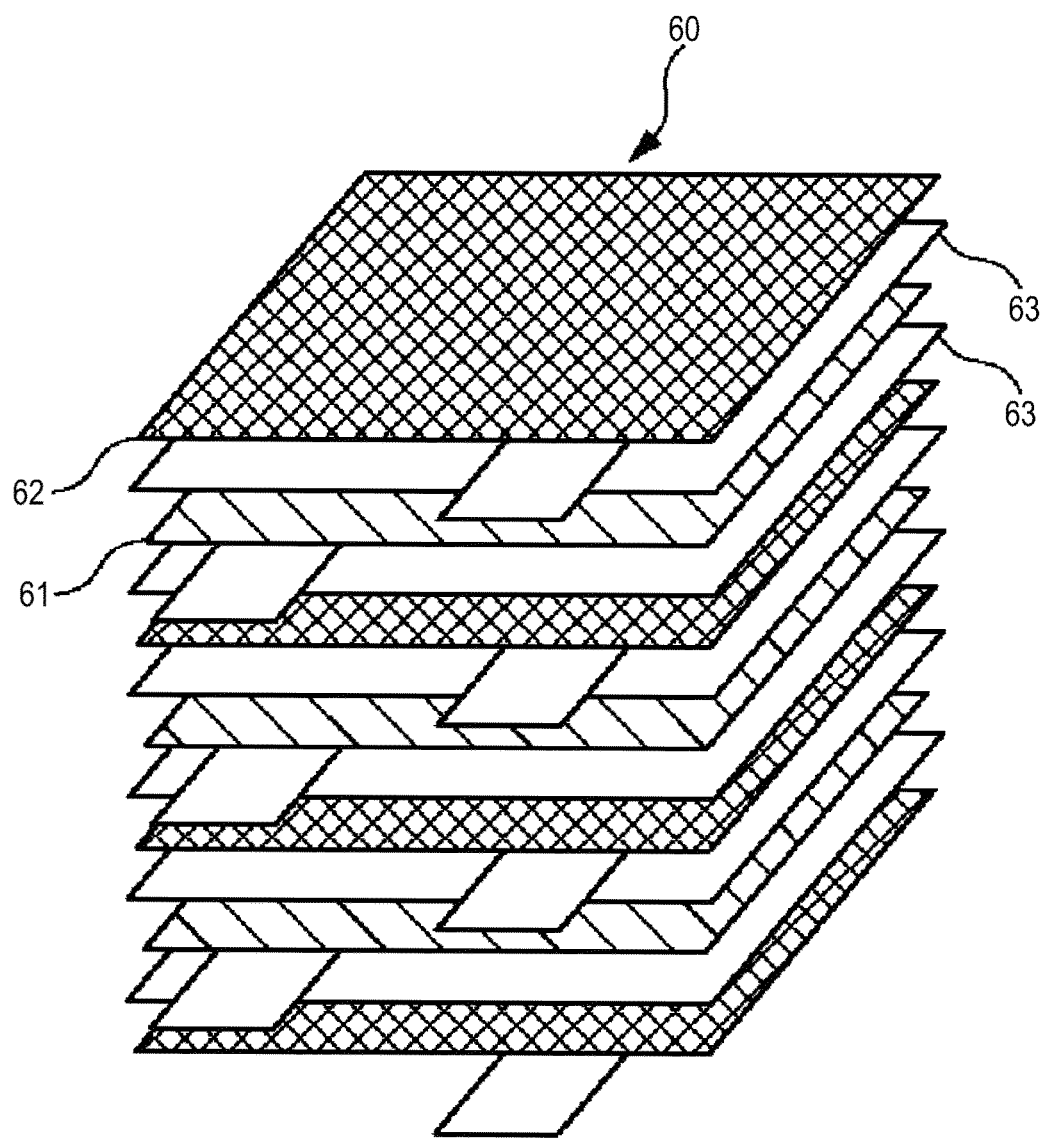
FIG. 9 is perspective view illustrating another exemplary configuration of a nonaqueous electrolyte battery according to an embodiment.

As illustrated in FIG. 9, a positive electrode 61 is obtained by forming a positive electrode active material layer on the both sides of a rectangular positive electrode collector. Preferably, the positive electrode collector of the positive electrode 61 is formed integrally with the positive electrode terminal. Similarly, a negative electrode 62 is obtained by forming a negative electrode active material layer on a rectangular negative electrode collector.

The positive electrode 61 and the negative electrode 62 are laminated in turn with a separator 63 in between, and an electrode laminate 60 is formed. The laminated state of the electrodes in the electrode laminate 60 may be maintained by attaching an insulating tape or the like. The electrode laminate 60 is sheathed with, for example, a laminate film, and sealed inside a battery with the nonaqueous electrolyte. The gel electrolyte may be used instead of the nonaqueous electrolyte.

EXAMPLES

Specific examples of the present disclosure are described below. It should be noted, however, that the present disclosure is not restricted by the following descriptions.

The following nitrile compounds were used in Examples and Comparative Examples.
- Compound A: Malononitrile
- Compound B: Succinonitrile
- Compound C: Glutaronitrile
- Compound D: Adiponitrile
- Compound E: Suberonitrile
- Compound F: Acetonitrile
- Compound G: Propionitrile
- Compound H: Butyronitrile The following heteropolyacid compounds were used in Examples and Comparative Examples.
- Compound I: Silicomolybdic acid heptahydrate
- Compound J: Silicotungstic acid heptahydrate
- Compound K: Phosphomolybdic acid heptahydrate
- Compound L: Phosphotungstic acid heptahydrate Note that the mass of the heteropolyacid is the mass excluding the mass of the heteropolyacid bonding water. Similarly, the mass of the heteropolyacid compound is the mass excluding the mass of the heteropolyacid compound bonding water.

Example 1

In Example 1, the characteristics of cylindrical batteries were evaluated with varying amounts of the nitrile compound and heteropolyacid compound added to the electrolyte.

Example 1-1

Fabrication of Positive Electrode 91 parts by weight of the positive electrode active material lithium cobalt oxide ($LiCoO_2$), 6 parts by mass of the conductive agent graphite, and 3 parts by mass of the binder polyvinylidene fluoride (PVdF) were mixed, and N-methylpyrrolidone was added to obtain a positive electrode mixture slurry. The positive electrode mixture slurry was then evenly coated over the both surfaces of a 12-μm thick aluminum foil, dried, and compression molded with a roller press machine to obtain a positive electrode sheet provided with a positive electrode active material layer (volume density of 3.40 g/cc). Finally, the positive electrode sheet was cut into a 56-mm width and a 520-mm length, and an aluminum (Al) positive electrode lead was welded to one end of the positive electrode collector to obtain a positive electrode.

Fabrication of Negative Electrode 97 parts by weight of the negative electrode active material artificial graphite powder, and 3 parts by weight of the binder polyvinylidene fluoride (PVdF) were mixed, and N-methylpyrrolidone was added to obtain a negative electrode mixture slurry. The negative electrode mixture slurry was then evenly coated over the both surfaces of a 15-μm thick copper foil (negative electrode collector), dried, and compression molded with a roller press machine to obtain a negative electrode sheet provided with a negative electrode active material layer (volume density of 1.65 g/cc). Finally, the negative electrode sheet was cut into a 58-mm width and a 600-mm length, and a nickel (Ni) negative electrode lead was welded to one end of the negative electrode collector to obtain a negative electrode.

Adjustment of Nonaqueous Electrolyte

A solution containing 1.2 mol/kg of the electrolyte salt lithium hexafluorophosphate ($LiPF_6$) in a 3:7 (weight ratio) mixture of ethylene carbonate (EC) and dimethyl carbonate (DMC) was prepared. Then, the nitrile compound A and the heteropolyacid compound I were dissolved therein in the concentrations presented in Table 1.

Battery Assembly

The positive electrode and the negative electrode were laminated via a separator provided in the form of a 25 μm-thick microporous polypropylene film. The laminate was wound multiple times in a spiral fashion, and the terminating end was fixed with an adhesive tape to obtain a wound electrode unit. Then, after preparing a nickel-plated iron battery canister, the wound electrode unit was sandwiched between a pair of insulating plates, and the negative electrode lead and the positive electrode lead were welded to the battery canister and to the safety valve mechanism, respectively. The wound electrode unit was then placed inside the battery canister, and the electrolyte was injected into the battery canister under reduced pressure. The cylindrical battery of Example 1-1 was fabricated in this manner.

Formation of a gel coating on the negative electrode surface was confirmed in the battery disassembled after preliminary charging.

Examples 1-2 to 1-13

Cylindrical batteries were fabricated in the same manner as in Example 1-1, except that the nitrile compound A and the heteropolyacid compound I were mixed in the concentrations presented in Table 1.

Comparative Example 1-1

A cylindrical battery was fabricated in the same manner as in Example 1-1, except that the nitrile compound A and the heteropolyacid compound I were not added.

Comparative Examples 1-2 to 1-4

Cylindrical batteries were fabricated in the same manner as in Example 1-1, except that the nitrile compound A was mixed in the concentrations presented in Table 1, and that the heteropolyacid compound I was not added.

Comparative Examples 1-5 and 1-6

Cylindrical batteries were fabricated in the same manner as in Example 1-1, except that the nitrile compound A was not added, and that the heteropolyacid compound I was mixed in the concentrations presented in Table 1.

The batteries of Examples and Comparative Examples were evaluated as follows.

Battery Evaluation (a) Initial Capacity and High-Temperature Cycle Test

Each battery was subjected to two cycles of charge and discharge under 0.2 C current in a 23° C. atmosphere, and the discharge capacity after the second cycle was measured. The charge and discharge was then repeated in 300 cycles in a 45° C. atmosphere, and the percentage remaining discharge capacity after 300 cycles relative to the discharge capacity after 2 cycles was calculated according to the following equation.

(Discharge capacity after 300 cycles/discharge capacity after 2 cycles)×100(%)

The battery was charged to the upper limit voltage of 4.2 V under a constant current of 0.2 C, and charged further to the current value of 0.05 C at the constant upper limit voltage of 4.2 V. The battery was then discharged to the final voltage of 3.0 V under the constant current of 0.2 C. Note that "0.2 C" is the current value with which the theoretical capacity fully discharges in 5 hours, and "0.05 C" is the current value with which the theoretical capacity fully discharges in 20 hours.

(b) High-Temperature Continuous Charging Test

Each battery was charged to the upper limit voltage of 4.2 V under a constant current of 0.2 C in a 60° C. atmosphere, and charged further to the current value of 0.05 C at the constant upper limit voltage of 4.2 V. Charging was continued in the same atmosphere to the final current of 0 mA, and the time before the cutoff valve activated was determined. The continuous charging test was performed for 300 hours, and batteries that did not have their cutoff valves activated after 300 hours were discharged to the final voltage of 3.0 V under the 0.2 C constant current, and the percentage remaining discharge capacity after the continuous charging was determined.

(d) Reduction in Detected Amounts of Metal Atoms on Electrode Surface

Batteries in the discharge state after the initial charge and discharge and after the high-temperature continuous charging were disassembled. The negative electrode surface of each disassembled battery was then observed by energy dispersive X-ray spectrometry using a scanning electron microscope (SEM-EDX; JEOL), and the amount of metal atoms originating from the heteropolyacid on the negative electrode surface was measured. Reductions in the amount of metal atoms in the batteries after the high-temperature continuous charging were then calculated.

The "metal atoms" measured in Example 1 are the molybdenum atoms in the silicomolybdic acid heptahydrate (heteropolyacid compound I) added to the electrolyte. Smaller reductions mean less dissolving and thus more stability in the SEI coating initially formed on the negative electrode surface, and thus indicate less deterioration during high-temperature use.

Note that the measurement was made only in Examples 1-1 to 1-13 and Comparative Examples 1-5 and 1-6 in which the heteropolyacid compound was added.

Table 1 below presents the test results.

TABLE 1

| | Nitrile compound | | Heteropolyacid compound | | Remaining rate after high-temperature cycle | High-temperature continuous charging retention time | Percentage remaining discharge capacity after continuous charging | Reduction in detected amount of metal atoms |
|---|---|---|---|---|---|---|---|---|
| | Type | Weight % | Type | Weight % | (%) | (h) | (%) | [Number of atoms, %] |
| Example 1-1 | Compound A | 0.01 | Compound I | 0.5 | 75 | 142 | — | 1.37 |
| Example 1-2 | | 0.05 | | | 86 | 248 | — | 0.55 |
| Example 1-3 | | 0.1 | | | 87 | >300 | 84 | 0.28 |
| Example 1-4 | | 0.5 | | | 90 | >300 | 90 | 0.13 |
| Example 1-5 | | 1 | | 0.01 | 80 | 112 | — | <0.1 |
| Example 1-6 | | | | 0.05 | 85 | >300 | 89 | <0.1 |
| Example 1-7 | | | | 0.1 | 90 | >300 | 90 | <0.1 |
| Example 1-8 | | | | 0.5 | 92 | >300 | 91 | <0.1 |
| Example 1-9 | | | | 1 | 92 | >300 | 88 | 0.23 |
| Example 1-10 | | | | 3 | 88 | >300 | 83 | 1.19 |
| Example 1-11 | | 3 | | 0.5 | 88 | >300 | 86 | <0.1 |
| Example 1-12 | | 5 | | | 84 | >300 | 84 | <0.1 |
| Example 1-13 | | 10 | | | 80 | >300 | 80 | <0.1 |
| Comparative Example 1-1 | — | — | — | — | 62 | 36 | — | — |
| Comparative Example 1-2 | Compound A | 0.5 | — | — | 65 | 61 | — | — |
| Comparative Example 1-3 | | 1 | — | — | 68 | 75 | — | — |
| Comparative Example 1-4 | | 3 | — | — | 60 | 76 | — | — |
| Comparative Example 1-5 | — | — | Compound I | 0.5 | 70 | 40 | — | 2.28 |
| Comparative Example 1-6 | — | — | | 1 | 75 | 44 | — | 4.21 |

(c) Percentage Remaining Discharge Capacity after High-Temperature Continuous Charging The percentage remaining discharge capacity after the constant current discharge of the continuously charged battery to the final voltage of 3.0 V at 0.5 C was determined as in the (b) high-temperature continuous charging test. The percentage remaining discharge capacity after the high-temperature continuous charging was calculated according to the following equation.

Percentage remaining discharge capacity after high-temperature continuous charging [%]=(discharge capacity after high-temperature continuous charging/discharge capacity after 2 cycles)×100

It can be seen from Table 1 that the continuous charging retention time under high-temperature environment improves with the use of the nonaqueous electrolyte containing the nitrile compound and the heteropolyacid compound according to the present disclosure.

For example, there are notable improvements in high-temperature continuous charging retention time in Examples 1-11 to 1-13 in which the nitrile compound and the heteropolyacid compound were added, compared to Comparative Example 1-1 in which the nitrile compound and the heteropolyacid compound were not added. Shorter continuous charging retention times mean that the time to cutoff valve activation due to gas production, or the time to the tearing of the laminate pack is shorter, meaning that the battery needs to be replaced once the cutoff valve activates.

By comparing Comparative Example 1-1 with Comparative Examples 1-2 to 1-4 in which only the nitrile compound was added, it was found that the resistance to continuous charging improves even with the nitrile compound alone, but the effects were smaller. Note that increasing the amount of nitrile compound above 1% did not improve the continuous charging retention time, but made the cycle characteristics worse.

Further, by comparing Comparative Example 1-1 with Comparative Examples 1-5 and 1-6 in which only the heteropolyacid compound was added, the addition of only the heteropolyacid compound did not improve the high-temperature battery characteristics. This is considered to be due to the insufficient high-temperature stability of the heteropolyacid SEI coating formed at the initial charging, incapable of exhibiting effects as a result of being dissolved in the absence of the nitrile compound. It was thus found that the discharge capacity during high-temperature continuous charging can be improved with the use of the nonaqueous electrolyte that contains the nitrile compound and the heteropolyacid compound according to the present disclosure.

The co-presence of at least 0.1% nitrile compound and at least 0.1% heteropolyacid compound was very effective at improving the high-temperature cycle and high-temperature continuous charging. The presence of the heteropolyacid compound suppressed the adverse effect of the nitrile compound on the battery characteristics, and improved the high-temperature characteristics with increasing amounts of nitrile compound.

Conceivably, this is because the deterioration of battery characteristics during the continuous charge is caused by the side reactions at the positive and negative electrodes. The addition of the nitrile compound stabilizes the transition metal at the positive electrode, and thus improves the continuous charge characteristics; however, the battery characteristics are impaired by the gas production or other adverse effects that occur at the negative electrode. Adding the heteropolyacid compound stabilizes the cycle by the formation of the SEI at the negative electrode, but impairs battery characteristics as the deterioration of the positive electrode proceeds. With both the nitrile compound and the heteropolyacid compound, stronger effects can be obtained as the nitrile compound stabilizes the transition metal in the negative electrode SEI that originates from the heteropolyacid compound.

It was also found that the amount of detected metal atoms on the electrode surface was smaller in Examples 1-1 to 1-13 than in Comparative Examples 1-5 and 1-6. Smaller amounts of detected metal atoms mean that the transition metal in the negative electrode SEI is stable even during the high-temperature continuous charge, and that the gas production at the negative electrode is suppressed by the nonaqueous electrolyte containing the nitrile compound and the heteropolyacid compound.

Example 2

In Example 2, the characteristics of cylindrical batteries were evaluated with different combinations of the nitrile compounds A to H and the heteropolyacid compounds I to L.

Examples 2-1 to 2-32

Cylindrical batteries were fabricated in the same manner as in Example 1-1, except that the nitrile compounds and the heteropolyacid compounds were combined as presented in Table 2.

Battery Evaluation
(a) Initial Capacity and High-Temperature Cycle Test
(b) High-Temperature Continuous Charging Test
(c) Percentage Remaining Discharge Capacity after High-Temperature Continuous Charging The batteries were evaluated with regard to these criteria according to the methods described in Example 1.

Table 2 below presents the test results.

TABLE 2

| | Nitrile compound | | Heteropolyacid compound | | Remaining rate after high-temperature cycle (%) | Continuous charging retention time (h) | Percentage remaining discharge capacity after continuous charging (%) |
|---|---|---|---|---|---|---|---|
| | Type | Weight % | Type | Weight % | | | |
| Example 2-1 | Compound A | 1 | Compound I | 0.5 | 92 | >300 | 91 |
| Example 2-2 | | | Compound J | | 92 | >300 | 90 |
| Example 2-3 | | | Compound K | | 90 | >300 | 89 |
| Example 2-4 | | | Compound L | | 90 | >300 | 90 |
| Example 2-5 | Compound B | 1 | Compound I | | 94 | >300 | 92 |
| Example 2-6 | | | Compound J | | 94 | >300 | 92 |
| Example 2-7 | | | Compound K | | 93 | >300 | 91 |
| Example 2-8 | | | Compound L | | 93 | >300 | 91 |
| Example 2-9 | Compound C | 1 | Compound I | | 94 | >300 | 92 |
| Example 2-10 | | | Compound J | | 94 | >300 | 92 |
| Example 2-11 | | | Compound K | | 93 | >300 | 90 |
| Example 2-12 | | | Compound L | | 94 | >300 | 91 |
| Example 2-13 | Compound D | 1 | Compound I | | 93 | >300 | 90 |
| Example 2-14 | | | Compound J | | 93 | >300 | 91 |
| Example 2-15 | | | Compound K | | 92 | >300 | 91 |
| Example 2-16 | | | Compound L | | 93 | >300 | 92 |
| Example 2-17 | Compound E | 1 | Compound I | 0.5 | 90 | >300 | 92 |
| Example 2-18 | | | Compound J | | 90 | >300 | 90 |
| Example 2-19 | | | Compound K | | 88 | >300 | 88 |
| Example 2-20 | | | Compound L | | 87 | >300 | 89 |
| Example 2-21 | Compound F | 1 | Compound I | | 80 | >300 | 81 |
| Example 2-22 | | | Compound J | | 80 | >300 | 81 |
| Example 2-23 | | | Compound K | | 78 | >300 | 79 |
| Example 2-24 | | | Compound L | | 79 | >300 | 80 |
| Example 2-25 | Compound G | 1 | Compound I | | 81 | >300 | 83 |
| Example 2-26 | | | Compound J | | 82 | >300 | 83 |
| Example 2-27 | | | Compound K | | 80 | >300 | 82 |

TABLE 2-continued

| | Nitrile compound | | Heteropolyacid compound | | Remaining rate after high-temperature cycle (%) | Continuous charging retention time (h) | Percentage remaining discharge capacity after continuous charging (%) |
|---|---|---|---|---|---|---|---|
| | Type | Weight % | Type | Weight % | | | |
| Example 2-28 | | | Compound L | | 79 | >300 | 83 |
| Example 2-29 | Compound H | 1 | Compound I | | 83 | >300 | 85 |
| Example 2-30 | | | Compound J | | 84 | >300 | 86 |
| Example 2-31 | | | Compound K | | 80 | 281 | — |
| Example 2-32 | | | Compound L | | 82 | 278 | — |

As demonstrated by the results presented in Table 2, the high-temperature cycle and continuous charging characteristics involving reaction at the positive and negative electrodes were found to improve with the use of the nitrile compound and the heteropolyacid compound according to the present disclosure. It was found that the preferred nitrile compounds are those having smaller nitrile group concentrations, and that do not easily undergo gasification in the compounds themselves, specifically, those having 2 to 4 carbon atoms, excluding the carbon atoms contained in the nitrile group. Silicomolybdic acid or silicotungstic acid is preferable as the heteropolyacid compound from the standpoint of high-temperature cycle and discharge capacity after continuous charging. Compared to the phosphorus counterparts, the silicon-containing heteropolyacid compounds are believed to provide higher protection for the electrodes.

7. Other Embodiments

While the present disclosure has been described with respect to certain embodiments and examples, the present disclosure is not limited by these embodiments and examples, and various modifications and applications are possible within the scope of the present disclosure.

For example, while the foregoing Embodiments and Examples described batteries of a laminate film type, batteries of a cylindrical battery structure and a rectangular battery structure, and batteries using the laminate electrode unit, the present disclosure is not limited to these. For example, the present disclosure is also applicable to and equally effective in other battery structures, including batteries of coin and button structures. Further, the structure of the wound electrode unit is not limited to the wound structure and the laminate structure, and various other structures, for example, such as a folded structure, also can be used.

Further, even though the foregoing Embodiments and Examples were described through the use of lithium for the electrode reaction, the present disclosure is also applicable to and equally effective with other alkali metals such as sodium (Na) and potassium (K), alkali earth metals such as magnesium and calcium (Ca), and other light metals such as aluminum. Further, lithium metal may be used as the negative electrode active material.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. A nonaqueous electrolyte comprising:
a nonaqueous solvent;
an electrolyte salt;
a hydrocarbon compound having a nitrile group; and
at least one of a heteropolyacid and a heteropolyacid compound.

2. The nonaqueous electrolyte of claim 1, wherein the hydrocarbon compound having a nitrile group includes two nitrile groups.

3. The nonaqueous electrolyte of claim 2, wherein the hydrocarbon compound having a nitrile group has 2 to 4 carbon atoms, excluding the carbon atoms contained in the nitrile groups.

4. The nonaqueous electrolyte of claim 1, wherein the content of the hydrocarbon compound having a nitrile group ranges from 0.05 weight % to 5.0 weight %, inclusive.

5. The nonaqueous electrolyte of claim 1, wherein the heteropolyacid and the heteropolyacid compound are represented by any of the following formulae (I), (II), (III), and (IV), $$H_xA_y[BD_6O_{24}].zH_2O \qquad (I)$$

wherein A represents lithium (Li), sodium (Na), potassium (K), rubidium (Rb), cesium (Cs), magnesium (Mg), calcium (Ca), aluminum (Al), ammonium ($NH_4$), an ammonium salt, or a phosphonium salt, B represents phosphorus (P), silicon (Si), arsenic (As), or germanium (Ge), D is one or more elements selected from titanium (Ti), vanadium (V), chromium (Cr), manganese (Mn), iron (Fe), cobalt (Co), nickel (Ni), copper (Cu), zinc (Zn), gallium (Ga), zirconium (Zr), niobium (Nb), molybdenum (Mo), technetium (Tc), rhodium (Rh), cadmium (Cd), indium (In), tin (Sn), tantalum (Ta), tungsten (W), rhenium (Re), and thallium (Tl), x, y, and z satisfy $0 \leq x \leq 8$, $0 \leq y \leq 8$, and $0 \leq z \leq 50$, respectively, where at least one of x and y is not 0;

$$H_xA_y[BD_{12}O_{40}].zH_2O \qquad (II)$$

wherein A represents lithium (Li), sodium (Na), potassium (K), rubidium (Rb), cesium (Cs), magnesium (Mg), calcium (Ca), aluminum (Al), ammonium ($NH_4$), an ammonium salt, or a phosphonium salt, B represents phosphorus (P), silicon (Si), arsenic (As), or germanium (Ge), D is one or more elements selected from titanium (Ti), vanadium (V), chromium (Cr), manganese (Mn), iron (Fe), cobalt (Co), nickel (Ni), copper (Cu), zinc (Zn), gallium (Ga), zirconium (Zr), niobium (Nb), molybdenum (Mo), technetium (Tc), rhodium (Rh), cadmium (Cd), indium (In), tin (Sn), tantalum (Ta), tungsten (W), rhenium (Re), and thallium (Tl), x, y, and z satisfy $0 \leq x \leq 4$, $0 \leq y \leq 4$, and $0 \leq z \leq 50$, respectively, where at least one of x and y is not 0;

$$H_xA_y[B_2D_{18}O_{62}].zH_2O \qquad (III)$$

wherein A represents lithium (Li), sodium (Na), potassium (K), rubidium (Rb), cesium (Cs), magnesium (Mg), calcium (Ca), aluminum (Al), ammonium ($NH_4$), an ammonium salt, or a phosphonium salt, B represents phosphorus (P), silicon (Si), arsenic (As), or germanium (Ge), D is one or more elements selected from titanium (Ti), vanadium (V), chromium (Cr), manganese (Mn), iron (Fe), cobalt (Co), nickel (Ni), copper (Cu), zinc (Zn), gallium (Ga), zirconium (Zr), niobium (Nb), molybdenum (Mo), technetium (Tc), rhodium (Rh), cadmium (Cd), indium (In), tin (Sn), tantalum (Ta), tungsten (W), rhenium (Re), and thallium (Tl), x, y, and z satisfy $0 \leq x \leq 8$, $0 \leq y \leq 8$, and $0 \leq z \leq 50$, respectively, where at least one of x and y is not 0;

$$H_xA_y[B_5D_{30}O_{110}].zH_2O \qquad (IV)$$

wherein A represents lithium (Li), sodium (Na), potassium (K), rubidium (Rb), cesium (Cs), magnesium (Mg), calcium (Ca), aluminum (Al), ammonium ($NH_4$), an ammonium salt, or a phosphonium salt, B represents phosphorus (P), silicon (Si), arsenic (As), or germanium (Ge), D is one or more elements selected from titanium (Ti), vanadium (V), chromium (Cr), manganese (Mn), iron (Fe), cobalt (Co), nickel (Ni), copper (Cu), zinc (Zn), gallium (Ga), zirconium (Zr), niobium (Nb), molybdenum (Mo), technetium (Tc), rhodium (Rh), cadmium (Cd), indium (In), tin (Sn), tantalum (Ta), tungsten (W), rhenium (Re), and thallium (Tl), x, y, and z satisfy $0 \leq x \leq 15$, $0 \leq y \leq 15$, and $0 \leq z \leq 50$, respectively, where at least one of x and y is not 0.

6. The nonaqueous electrolyte of claim 1, wherein the contents of the heteropolyacid and the heteropolyacid compound range from 0.01 weight % to 3.0 weight %, inclusive.

7. The nonaqueous electrolyte of claim 1, wherein the electrolyte salt includes at least one of lithium hexafluorophosphate ($LiPF_6$), lithium tetrafluoroborate ($LiBF_4$), lithium perchloride ($LiClO_4$), and lithium hexafluoroarsenate ($LiAsF_6$).

8. A nonaqueous electrolyte battery comprising:
a positive electrode;
a negative electrode; and
a nonaqueous electrolyte,
wherein the negative electrode includes a gel coating in at least a portion on a surface of the negative electrode, the gel coating originating from at least one of a heteropolyacid and a heteropolyacid compound, and including an amorphous polyacid and/or polyacid salt compound that contain one or more polyelements, and
wherein a component that originates from a hydrocarbon compound having a nitrile group is adsorbed in at least a portion on a surface of the coating.

9. The nonaqueous electrolyte battery of claim 8, wherein the heteropolyacid and the heteropolyacid compound are represented by any of the following formulae (I), (II), (III), and (IV), $$H_xA_y[BD_6O_{24}].zH_2O \qquad (I)$$

wherein A represents lithium (Li), sodium (Na), potassium (K), rubidium (Rb), cesium (Cs), magnesium (Mg), calcium (Ca), aluminum (Al), ammonium ($NH_4$), an ammonium salt, or a phosphonium salt, B represents phosphorus (P), silicon (Si), arsenic (As), or germanium (Ge), D is one or more elements selected from titanium (Ti), vanadium (V), chromium (Cr), manganese (Mn), iron (Fe), cobalt (Co), nickel (Ni), copper (Cu), zinc (Zn), gallium (Ga), zirconium (Zr), niobium (Nb), molybdenum (Mo), technetium (Tc), rhodium (Rh), cadmium (Cd), indium (In), tin (Sn), tantalum (Ta), tungsten (W), rhenium (Re), and thallium (Tl), x, y, and z satisfy $0 \leq x \leq 8$, $0 \leq y \leq 8$, and $0 \leq z \leq 50$, respectively, where at least one of x and y is not 0;

$$H_xA_y[BD_{12}O_{40}].zH_2O \qquad (II)$$

wherein A represents lithium (Li), sodium (Na), potassium (K), rubidium (Rb), cesium (Cs), magnesium (Mg), calcium (Ca), aluminum (Al), ammonium ($NH_4$), an ammonium salt, or a phosphonium salt, B represents phosphorus (P), silicon (Si), arsenic (As), or germanium (Ge), D is one or more elements selected from titanium (Ti), vanadium (V), chromium (Cr), manganese (Mn), iron (Fe), cobalt (Co), nickel (Ni), copper (Cu), zinc (Zn), gallium (Ga), zirconium (Zr), niobium (Nb), molybdenum (Mo), technetium (Tc), rhodium (Rh), cadmium (Cd), indium (In), tin (Sn), tantalum (Ta), tungsten (W), rhenium (Re), and thallium (Tl), x, y, and z satisfy $0 \leq x \leq 4$, $0 \leq y \leq 4$, and $0 \leq z \leq 50$, respectively, where at least one of x and y is not 0;

$$H_xA_y[B_2D_{18}O_{62}].zH_2O \qquad (III)$$

wherein A represents lithium (Li), sodium (Na), potassium (K), rubidium (Rb), cesium (Cs), magnesium (Mg), calcium (Ca), aluminum (Al), ammonium ($NH_4$), an ammonium salt, or a phosphonium salt, B represents phosphorus (P), silicon (Si), arsenic (As), or germanium (Ge), D is one or more elements selected from titanium (Ti), vanadium (V), chromium (Cr), manganese (Mn), iron (Fe), cobalt (Co), nickel (Ni), copper (Cu), zinc (Zn), gallium (Ga), zirconium (Zr), niobium (Nb), molybdenum (Mo), technetium (Tc), rhodium (Rh), cadmium (Cd), indium (In), tin (Sn), tantalum (Ta), tungsten (W), rhenium (Re), and thallium (Tl), x, y, and z satisfy $0 \leq x \leq 8$, $0 \leq y \leq 8$, and $0 \leq z \leq 50$, respectively, where at least one of x and y is not 0;

$$H_xA_y[B_5D_{30}O_{110}].zH_2O \qquad (IV)$$

wherein A represents lithium (Li), sodium (Na), potassium (K), rubidium (Rb), cesium (Cs), magnesium (Mg), calcium (Ca), aluminum (Al), ammonium ($NH_4$), an ammonium salt, or a phosphonium salt, B represents phosphorus (P), silicon (Si), arsenic (As), or germanium (Ge), D is one or more elements selected from titanium (Ti), vanadium (V), chromium (Cr), manganese (Mn), iron (Fe), cobalt (Co), nickel (Ni), copper (Cu), zinc (Zn), gallium (Ga), zirconium (Zr), niobium (Nb), molybdenum (Mo), technetium (Tc), rhodium (Rh), cadmium (Cd), indium (In), tin (Sn), tantalum (Ta), tungsten (W), rhenium (Re), and thallium (Tl), x, y, and z satisfy $0 \leq x \leq 15$, $0 \leq y \leq 15$, and $0 \leq z \leq 50$, respectively, where at least one of x and y is not 0.

* * * * *